United States Patent
Chittamuru et al.

(10) Patent No.: US 11,645,380 B2
(45) Date of Patent: May 9, 2023

(54) PROCESS-VARIABILITY-BASED ENCRYPTION FOR PHOTONIC COMMUNICATION ARCHITECTURES

(71) Applicant: Colorado State University Research Foundation, Fort Collins, CO (US)

(72) Inventors: Sai Vineel Reddy Chittamuru, Fort Collins, CO (US); Sudeep Pasricha, Fort Collins, CO (US); Ishan Thakkar, Fort Collins, CO (US)

(73) Assignee: Colorado State University Research Foundation, Fort Collins, CO (US)

( * ) Notice: Subject to any disclaimer, the term of this patent is extended or adjusted under 35 U.S.C. 154(b) by 415 days.

(21) Appl. No.: 16/434,420

(22) Filed: Jun. 7, 2019

(65) Prior Publication Data
US 2020/0125716 A1     Apr. 23, 2020

Related U.S. Application Data

(60) Provisional application No. 62/681,862, filed on Jun. 7, 2018.

(51) Int. Cl.
*G06F 21/00*     (2013.01)
*G06F 21/44*     (2013.01)
(Continued)

(52) U.S. Cl.
CPC .......... *G06F 21/44* (2013.01); *G06F 15/7825* (2013.01); *H04L 9/0866* (2013.01); *H04W 4/06* (2013.01); *H04W 12/069* (2021.01)

(58) Field of Classification Search
CPC ............... G06F 21/44; G06F 15/7825; H04W 12/069; H04W 4/06; H04L 63/06; H04L 9/0866; H04L 63/0428; H04L 9/3278
(Continued)

(56) References Cited

U.S. PATENT DOCUMENTS

| | | | | | |
|---|---|---|---|---|---|
| 6,163,392 | A | * | 12/2000 | Condict | H04B 10/29 398/1 |
| 7,184,527 | B1 | * | 2/2007 | Lin | H04M 1/663 370/352 |

(Continued)

OTHER PUBLICATIONS

R. Chakraborty, S. Narasirnhan, S. Bhunia, "Hardware Trojan: Threats and emerging solutions," in Proc. HLDVT, pp. 166-171, Nov. 2009.

(Continued)

*Primary Examiner* — Haresh N Patel
(74) *Attorney, Agent, or Firm* — Meunier Carlin & Curfman LLC

(57) ABSTRACT

The exemplified methods and systems provide hardware-circuit-level encryption for inter-core communication of photonic communication devices such as photonic network-on-chip devices. In some embodiments, the hardware-circuit level encryption uses authentication signatures that are based on process variation that inherently occur during the fabrication of the photonic communication device. The hardware level encryption can facilitate high bandwidth on-chip data transfers while preventing hardware-based trojans embedded in components of the photonic communication device such as PNoC devices or preventing external snooping devices from snooping data from the neighboring photonic signal transmission medium in a shared photonic signal transmission medium. In some embodiments, the hardware-circuit-level encryption is used for unicast/multicast traffic.

19 Claims, 16 Drawing Sheets

(51) Int. Cl.
   *H04W 4/06* (2009.01)
   *G06F 15/78* (2006.01)
   *H04L 9/08* (2006.01)
   *H04W 12/069* (2021.01)
   *H04L 29/06* (2006.01)

(58) Field of Classification Search
   USPC .................................................. 726/2
   See application file for complete search history.

(56) References Cited

U.S. PATENT DOCUMENTS

| | | | |
|---|---|---|---|
| 9,425,954 B1* | 8/2016 | Chalker | H04L 9/16 |
| 9,735,833 B2* | 8/2017 | Gross | H04W 4/021 |
| 2004/0067006 A1* | 4/2004 | Welch | G01R 31/31728 385/14 |
| 2005/0135811 A1* | 6/2005 | Lee | H04B 1/7163 398/139 |
| 2006/0215693 A1* | 9/2006 | Rodrigo | H04Q 11/0066 370/468 |
| 2010/0322638 A1* | 12/2010 | Scandurra | H04B 10/506 398/182 |
| 2011/0103799 A1* | 5/2011 | Shacham | H04B 10/25 398/115 |
| 2014/0189167 A1* | 7/2014 | Joergensen | G06F 11/3058 710/16 |
| 2014/0250019 A1* | 9/2014 | Causey | G06Q 30/0645 705/307 |
| 2014/0339910 A1* | 11/2014 | Sealy | H02J 50/12 307/104 |
| 2014/0372510 A1* | 12/2014 | Fausak | H04L 67/025 709/203 |
| 2015/0061404 A1* | 3/2015 | Lamenza | H01F 38/14 307/104 |
| 2015/0358109 A1* | 12/2015 | D'Errico | H04Q 11/0005 398/19 |
| 2016/0087687 A1* | 3/2016 | Kesler | H04B 5/0037 307/104 |
| 2016/0164748 A1* | 6/2016 | Kim | G06N 5/046 706/47 |
| 2017/0126316 A1* | 5/2017 | Yuan | H04B 10/70 |
| 2017/0248832 A1* | 8/2017 | Kippenberg | G02F 1/3534 |
| 2017/0255919 A1* | 9/2017 | Aabye | G06Q 20/20 |
| 2018/0091001 A1* | 3/2018 | Meichle | B60L 53/124 |
| 2018/0115366 A1* | 4/2018 | Kakande | H04B 10/25891 |
| 2018/0146362 A1* | 5/2018 | Hou | H04W 8/08 |
| 2018/0167312 A1* | 6/2018 | Liu | H04W 40/244 |
| 2018/0234399 A1* | 8/2018 | Yin | G06F 21/60 |
| 2018/0357432 A1* | 12/2018 | Tang | H04L 9/0822 |
| 2019/0205742 A1* | 7/2019 | Takeda | G06N 3/0445 |
| 2019/0296911 A1* | 9/2019 | Maki | H04L 9/0869 |
| 2020/0028700 A1* | 1/2020 | Zaks | H04L 12/06 |

OTHER PUBLICATIONS

M. Tehranipoor and F. Koushanfar, "A Survey of Hardware Trojan Taxonomy and Detection," IEEE Design & Test, pp. 10-25, Feb. 2009.
S. Skorobogatov and C. Woods, "Breakthrough silicon scanning discovers backdoor in military chip," in Proc. CHES, pp. 23-40, Sep. 2012.
W. J. Dally, B. Towles, "Route packets, not wires: On-Chip Interconnection Networks," in Proc. DAC, 684-689, 2001.
D. A. B. Miller, "Device requirements for optical interconnects to silicon chips," in JPROC, 97(7), pp. 1166-1185, 2009.
Batten, Christopher, et al. "Building many-core processor-to-DRAM networks with monolithic CMOS silicon photonics." IEEE Micro 29.4 (2009): 8-21, p. 8-21.
I. Thakkar, S. V. R. Chittamuru, S. Pasricha, "Improving the Reliability and Energy-Efficiency of High-Bandwidth Photonic NoC Architectures with Multilevel Signaling," in Proc. NOCS, Oct. 2017, 8 pages.
Y. Pan et al., "Firefly: Illuminating future network-on-chip with nanophotonics," in Proc. ISCA, 2009, 12 pages.
Y. Pan, J. Kim, G.Memik, "Flexishare: Channel sharing for an energy efficient nanophotonic crossbar," in Proc. HPCA, 2010, 12 pages.
S. V. R. Chittamuru, S. Pasricha, "SPECTRA: A Framework for Thermal Reliability Management in Silicon-Photonic Networks-on-Chip", in Proc. VLSID, Jan. 2016, 86-91, p. 86-91.
D. M. Ancajas, et al., "Fort-NoCs: Mitigating the Threat of a Compromised NoC," in Proc. DAC, 2014, 6 pages.
C. Li, et al., "Energy-efficient optical broadcast for nanophotonic networks-on-chip," in Proc. OIC, pp. 64-65, 2012.
S. V. R. Chittamuru, S. Desai, S. Pasricha, "SWIFTNoC: A reconfigurable silicon photonic network with multicast enabled channel sharing for multicore architectures," in ACM JETC, 13(4), No. 58:27, 2017, p. 1.
S. K. Selvaraja., "Wafer-Scale Fabrication Technology for Silicon Photonic Integrated Circuits," PhD thesis, Ghent University, 2011, 246 pages.
K. Padmaraju et al., "Wavelength Locking and Thermally Stabilizing Microring Resonators Using Dithering Signals," in JLT, 32 (3), 505-512, 2013.
C. H. Gebotys, et al., "A framework for security on NoC technologies," in Proc. ISVLSI, Feb. 2003, p. 1.
H. K. Kapoor, et al., "A Security Framework for NoC Using Authenticated Encryption and Session Keys," in CSSP, 2013, p. 1.
S. V. R. Chittamuru, I. Thakkar, S. Pasricha, "Process Variation Aware Crosstalk Mitigation for DWDM based Photonic NoC Architectures," in Proc. ISQED, Mar. 2016, p. 1.
S. V. R. Chittamuru, I. Thakkar, S. Pasricha, "PICO: Mitigating Heterodyne Crosstalk Due to Process Variations and Intermodulation Effects in Photonic NoCs," in Proc. DAC, Jun. 2016, p. 1.
S. Sarangi et al., "Varius: A model of process variation and resulting timing errors for microarchitects," IEEE TSM, 21(1), pp. 3-13, 2008.
S. Xiao, M. H. Khan, H. Shen, and M. Qi, "Modeling and measurement of losses in silicon-on-insulator resonators and bends," in Optics Express, 15(17), p. 10553-10561, 2007.
C. Sun et al., "DSENT—a tool connecting emerging photonics with electronics for opto-electronic networks-on-chip modeling," NOCS, 2012, 10 pages.
C. Bienia et al., "The PARSEC Benchmark Suit: Characterization and Architectural Implications," in PACT, Oct. 2008, 10 pages.
N. Binkert et al., "The gem5 Simulator," in CA News, May 2011, 7 pages.
CACTI 6.5, "An integrated cache and memory access time, cycle time, area, leakage, and dynamic power model" accessed on-line: http://www.hpl.hp.com/research/cacti/ 2008, 2 pages.
S. V. R. Chittamuru, I. Thakkar, S. Pasricha, "Analyzing Voltage Bias and Temperature Induced Aging Effects in Photonic Interconnects for Manycore Computing," in Proc. SLIP, Jun. 2017, p. 1.
C. Chen and A. Joshi, "Runtime management of laser power in siliconphotonic multibus NoC architecture," in Proc. IEEE JQE, 2013, 13 pages.
I. Thakkar, S. V. R. Chittamuru, S. Pasricha, "Mitigation of Homodyne Crosstalk Noise in Silicon Photonic NoC Architectures with Tunable Decoupling," in Proc. CODES+ISSS, Oct. 2016, p. 1.
S. V. R. Chittamuru, I. Thakkar, S. Pasricha, "HYDRA: Heterodyne Crosstalk Mitigation with Double Microring Resonators and Data Encoding for Photonic NoCs," in TVLSI, vol. 26, No. 1, 2018, p. 1.
D. Dang, S. V. R. Chittamuru, R. Mahapatra, and S. Pasricha, "Islands of Heaters: A Novel Thermal Management Framework for Photonic NoCs," in Proc. ASPDAC, Jan. 2017.
C. Li, M. Browning, P. V. Gratz, and S. Palermo, "LumiNOC: A Power-Efficient, High-Performance, Photonic Network-on-Chip," in IEEE TCAD, vol. 33, No. 6, pp. 826-838, 2014.
S. Pasricha, S. V. R. Chittamuru, and I. Thakkar, "Cross-Layer Thermal Reliability Management in Silicon Photonic Networks-on-Chip," in Proc. GLSVLSI, May 2018, p. 1.
I. Thakkar, S. V. R. Chittamuru, and S. Pasricha, "A comparative analysis of front-end and back-end compatible silicon pho-tonic on-chip interconnects," in Proc. SLIP, Jun. 2016, p. 1.

(56) References Cited

OTHER PUBLICATIONS

S. Pasricha and S. Bahirat, "OPAL: A Multi-Layer Hybrid Pho-tonic NoC for 3D ICs," in Proc. ASPDAC, Jan. 2011, p. 1.
S. Bahirat and S. Pasricha, "METEOR: Hybrid Photonic Ring-Mesh Network-on-Chip for Multicore Architectures," in ACM JETC, 13(3), 2014, p. 1.
I. Thakkar and S. Pasricha, "3D-Wiz: A Novel High Bandwidth, Optically Interfaced 3D DRAM Architecture with Reduced Random-Access Time," in Proc. ICCD, Oct. 2014, p. 1.
I. Thakkar and S. Pasricha, "3D-ProWiz: An Energy-Efficient and Optically-Interfaced 3D DRAM Architecture with Reduced Data Access Overhead," IEEE TMSCS, vol. 1, No. 3, Sep. 2015, 168-184, p. 1.
S. V. R. Chittamuru, I. Thakkar, V. Bhat, S. Pasricha, "SOTERIA: Exploiting Process Variations to Enhance Hardware Security with Photonic NoC Architectures," in Proc. DAC, Jun. 2018, p. 1.
A. K. Biswas, "Efficient Timing Channel Protection for Hybrid (Packet/Circuit-Switched) Network-on-Chip," in IEEE TPDS, vol. 29, No. 5, pp. 1044-1057, 2018.
S. Das, K. Basu, J. R. Doppa, P. P. Pande, R. Karri, and K. Chakrabarty, "Abetting Planned Obsolescence by Aging 3D Networks-on-Chip," in Proc. NOCS, Oct. 2018, 8 pages.
T. H. Boraten and A. K. Kodi, "Securing NoCs Against Timing Attacks with Non-Interference Based Adaptive Routing," in Proc. NOCS, Oct. 2018, 8 pages.
T. H. Boraten and A. K. Kodi, "Packet security with path sensitization for NoCs," in Proc. DATE, Mar. 2016, 4 pages.
C. Reinbrecht, A. Susin, L. Bossuet, and J. Sepulveda, "Gossip NoC—Avoiding Timing Side-Channel Attacks through Traffic Management," in Proc. ISVLSI, 2016, 7 pages.
M. D. Grammatikakis, K. Papadimitriou, P. Petrakis, A. Papagrigoriou, and G. Kornaros, "Security in MPSoCs: A NoC Firewall and an Evaluation Framework," in IEEE TCAD, vol. 34, No. 8, pp. 1344-1357, Aug. 2015.

* cited by examiner

PROCESS-VARIABILITY-BASED ENCRYPTION FOR PHOTONIC COMMUNICATION ARCHITECTURES

RELATED APPLICATION

The application claims priority to, and the benefit of, U.S. Provisional Application No. 62/681,862, titled "Hardware Security for Photonic Communication Architectures", filed Jun. 7, 2018, which is incorporated by reference herein in its entirety.

GOVERNMENT SUPPORT CLAUSE

This invention was made with government support under grants CCF1252500, CCF1302693 and CCF1813370 awarded by the National Science Foundation and grant FA9550-13-1-0110 awarded by the Air Force Office of Scientific Research. The government has certain rights in the invention.

FIELD OF THE INVENTION

The present disclosure generally relates to communication devices, in particular, hardware-level security features for photonic communication devices, including those that support multicast/broadcast communication.

BACKGROUND

In the post Dennard-scaling era, the use of multiple cores on a single microprocessor chip (referred to as a chip-multiprocessor (CMP)) has become a norm for many popular types of computing systems, including high-performance, embedded, mobile, and internet-of-things (IoT) systems. Complexity of hardware in modern chip-multiprocessors (CMPs) has increased to cope with the growing performance demands of modern Big Data and cloud computing applications. Chip-multiprocessor devices may use modern communication technology (e.g., photonic networks-on-chip (NoCs) and other network-on-chip technologies) that forms packet-switched network fabrics over the processing cores to transfer data either between on-chip components for inter-core communication or between devices for inter-chip communication. Recent developments in silicon photonics have enabled the integration of photonic components to interconnect with CMOS circuits on a chip. Photonic communication systems (e.g., photonic NoCs (PNoCs)) provide several prolific advantages over metallic counterparts (i.e., electric networks-on-chips, ENoCs) including the ability to communicate at near light speed, larger bandwidth density, and lower dynamic power dissipation.

Third-party hardware designs are frequently used to reduce the hardware design time of complex chip-multiprocessor devices, which often occurs when chips design are sent to third-party fabrication centers. However, third party designs can introduce security risks such as hardware trojans (HTs), which can lead to leakage of critical and sensitive information flowing through the chip-multiprocessor devices. These issues are particularly acute for broadcast and multicast communication.

There is increasing interest and benefit in addressing security risks in modern computing systems, particularly in the designs of chip-multiprocessor devices, including the designs of photonic communication devices and photonic network-on-chip devices.

SUMMARY

The exemplified methods and systems provide hardware-circuit-level encryption for inter-core communication of photonic communication devices such as photonic network-on-chip devices (e.g., to protect data in PNoC architectures and other photonic communication architectures, e.g., from snooping attacks). In some embodiments, the hardware-circuit level encryption uses authentication signatures that are based on process variation (PV) that inherently occur during the fabrication of the photonic communication device. The hardware level encryption can facilitate high bandwidth on-chip data transfers while preventing hardware-based trojans embedded in components of the photonic communication device (such as a PNoC device) or preventing external snooping devices from snooping data from the neighboring photonic signal transmission medium (e.g., photonic wavelength channels) in a shared photonic signal transmission medium. In some embodiments, the hardware-circuit-level encryption is used for unicast/multicast traffic. The exemplified methods and systems may be network agnostic, may mitigate PV, and may do so with minimal overhead while improving security, e.g., for any DWDM-based PNoC architecture.

As used herein, the term "photonic communication device" refers to integrated circuits having intra-die or inter-die photonic-based communication as well as systems of integrated circuits having chip-to-chip photonic-based communication. The photonic communication can include on-chip, off-chip, in-package, interposer-based photonic communication, and the like.

As used herein, the term "photonic signal transmission medium" refers to any free-space photonic communication medium including photonic-based waveguide such as optical fiber and rectangular or planar waveguides. Photonic signal transmission medium can include any medium or links that facilitates on-chip, off-chip, in-package, interposer-based photonic communication.

The exemplified methods and systems further provide an architecture-level reservation operation that decouples the data signal transmission medium (e.g., photonic waveguide) and a reservation signal transmission medium (e.g., photonic waveguide) to secure the photonic communication device from internal or external snooping or manipulation. The inventors understand this to be the first work that attempts to improve hardware security for photonic communication device, particularly for PNoCs. The exemplified methods and systems use analysis of security risks in photonic devices, particularly at the link-level, to assess the impact of these risks on PNoCs. The exemplified methods and systems, in some embodiments, provide a circuit-level PV-based security enhancement scheme that uses PV-based authentication signatures to protect data from snooping attacks in photonic waveguides and other photonic signal transmission medium. The exemplified methods and systems provide, in some embodiments, an architecture-level reservation-assisted security enhancement scheme to improve security in DWDM-based PNoCs. In some embodiments, the circuit- and architecture-level schemes are combined in a holistic framework (also referred to herein as SOTERIA). The framework enables security against snooping attacks in photonic communication devices such as PNoCs that is network agnostic (i.e., for any DWDM-based PNoC architecture), mitigates process-variation, and has minimal overhead.

In an aspect, a method is disclosed of securing a photonic signal transmission medium (e.g., photonic waveguides) in photonic communication (e.g., photonic networks-on-chip (PNoCs)) that couple pairs of photonic communication devices. The method includes encrypting, via digital logic or a processor executing a set of instructions, data transmitted over at least one gateway interface comprising at least one photonic signal transmission medium (e.g. photonic waveguide) coupled between a pair of photonic communication devices (e.g., photonic network-on-chip devices) (e.g., wherein the waveguide is used to form a communication path between the pair of devices), wherein an encryption key associated with the encryption of the at least one gateway interface is transmitted over the at least one gateway interface, and wherein the encryption key is different from other encryption keys used in the encryption of other gateway interfaces associated with the photonic communication devices.

In some embodiments, the encryption key is generated by electrical circuits connected to the photonic communication devices (e.g., photonic network-on-chip devices) based on a hardware-based random process-variation profile of components within at least one of the photonic communication devices associated with the at least one gateway interface.

In some embodiments, the encryption key is generated based on a process-variation profile of a microring resonator associated with a photonic communication device of the pair.

In some embodiments, the encryption key is generated based on the process-variation profile of the microring resonator (e.g., detector microring resonator) associated with a destination gateway interface for the pair.

In some embodiments, the method further includes generating (e.g., by a processor executing instructions or by logic circuitries) the encryption key for the at least one gateway interface during a testing operation (e.g., following fabrication, or other testing operation) of the photonic communication device (e.g., wherein the testing phase comprises generating an anti-symmetric analog error signal for each microring resonator that is proportional to a process-variation induced resonance shift in the microring resonator).

In some embodiments, the encryption key is maintained (e.g., in a ROM) at the gateway interfaces, or a component accessible thereto, associated with the at least one photonic signal transmission medium.

In some embodiments, a unicast encryption key is maintained at the gateway interfaces, or a component accessible thereto, for each destination gateway.

In some embodiments, a multicast encryption key is maintained at the gateway interfaces, or a component accessible thereto, wherein the multicast encryption gateway is associated with a set of two or more destination gateways, and wherein the multicast encryption key is generated from two or more encryption keys associated with the two or more destination gateways.

In some embodiments, the method further includes reserving (e.g., by a processor executing instructions or by logic circuitries) a photonic signal transmission medium (e.g., photonic data waveguide (i.e., the first waveguide)) for data transfer, in a reservation operation, the at least one gateway interface, wherein a reservation signal associated with the reservation operation is transmitted in a second photonic signal transmission medium (e.g., the second photonic waveguide) coupled between the pair of photonic communication devices (e.g., photonic networks-on-chip devices), and wherein the second photonic signal transmission medium is separate and distinct from the at least one photonic signal transmission medium.

In another aspect, a method is disclosed of securing (e.g., via a reservation-assisted security measure) photonic signal transmission medium coupled between a pair of photonic communication devices (e.g., photonic networks-on-chip devices)). The method includes reserving (e.g., by a processor executing instructions or by logic circuitries) in a reservation operation, at least one gateway interface comprising at least one photonic signal transmission medium (e.g., a photonic waveguide) coupled between a pair of photonic communication devices, wherein a reservation signal is transmitted in a second photonic signal transmission medium (e.g., second waveguide) coupled between the pair of photonic communication devices (e.g., pair of photonic network-on-chip devices), wherein the second photonic signal transmission medium is separate and distinct from the at least one photonic signal transmission medium, and wherein data signals are transmitted across the at least one photonic signal transmission medium.

In some embodiments, each of the photonic communication devices of the pair comprises a microring resonator-based switch coupled to at least two photonic signal transmission medium including the at least one photonic signal transmission medium (e.g., data waveguide) and the second photonic signal transmission medium (e.g., reservation waveguide).

In some embodiments, the method further includes disabling the second microring resonator during transmission of the data signals across the at least one photonic signal transmission medium.

In some embodiments, the method further includes enabling the second microring resonator when performing the reservation operation to route signals to the second photonic signal transmission medium.

In some embodiments, the data is transmitted over the at least one gateway interface as a secure unicast communication.

In some embodiments, the data is transmitted over the at least one gateway interface as a secure multicast communication.

In some embodiments, the method further includes transmitting, in a third photonic signal transmission medium, metadata for the communication, wherein the metadata indicates the communication comprises at least a portion of a unicast message or at least a portion of a multicast message.

In another aspect, a system is disclose comprising a plurality of processing-cores; and a photonic communication fabric (e.g., a photonic network-on-chip fabric). The fabric is coupled to, at least, a portion of the plurality of processing-cores, the photonic fabric comprising a first photonic signal transmission medium for transmission of data signals and a second photonic signal transmission medium for transmission of reservation signals.

In some embodiments, the system further includes control logic configured to reserve, in a reservation operation, at least one gateway interface over the second photonic signal transmission medium.

In some embodiments, the second photonic signal transmission medium is coupled to the first photonic signal transmission medium over a double microring resonator (e.g., wherein the second waveguide has a length that corresponds with a portion of the length of the first waveguide).

In some embodiments, the photonic fabric is connected to the portion of the plurality of processing-cores via at least one gateway interface, and each gateway interface associated with one or more processing core includes a bank of microring resonators that couples to the first photonic signal transmission medium.

In some embodiments, the each gateway interface associated with one or more processing cores includes a single detector microring resonator that couples to the second photonic signal transmission medium.

In some embodiments, the system further includes an encryption circuit, the encryption circuit having stored therein (e.g., in ROM) an encryption key associated with each of a plurality of gateway interfaces.

In some embodiments, each encryption key is associated with an assessed process-variation profile of a component of the gateway interface.

In some embodiments, each encryption key is associated with an assessed process-variation parameter of one or more microring resonators associated with the gateway interface.

In some embodiments, the second photonic signal transmission medium is not coupled to the first photonic signal transmission medium.

BRIEF DESCRIPTION OF THE DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures.

DETAILED SPECIFICATION

Each and every feature described herein, and each and every combination of two or more of such features, is included within the scope of the present invention provided that the features included in such a combination are not mutually inconsistent.

Example Photonic Communication Device with Hardware-Circuit-Level Encryption

Figure 1:
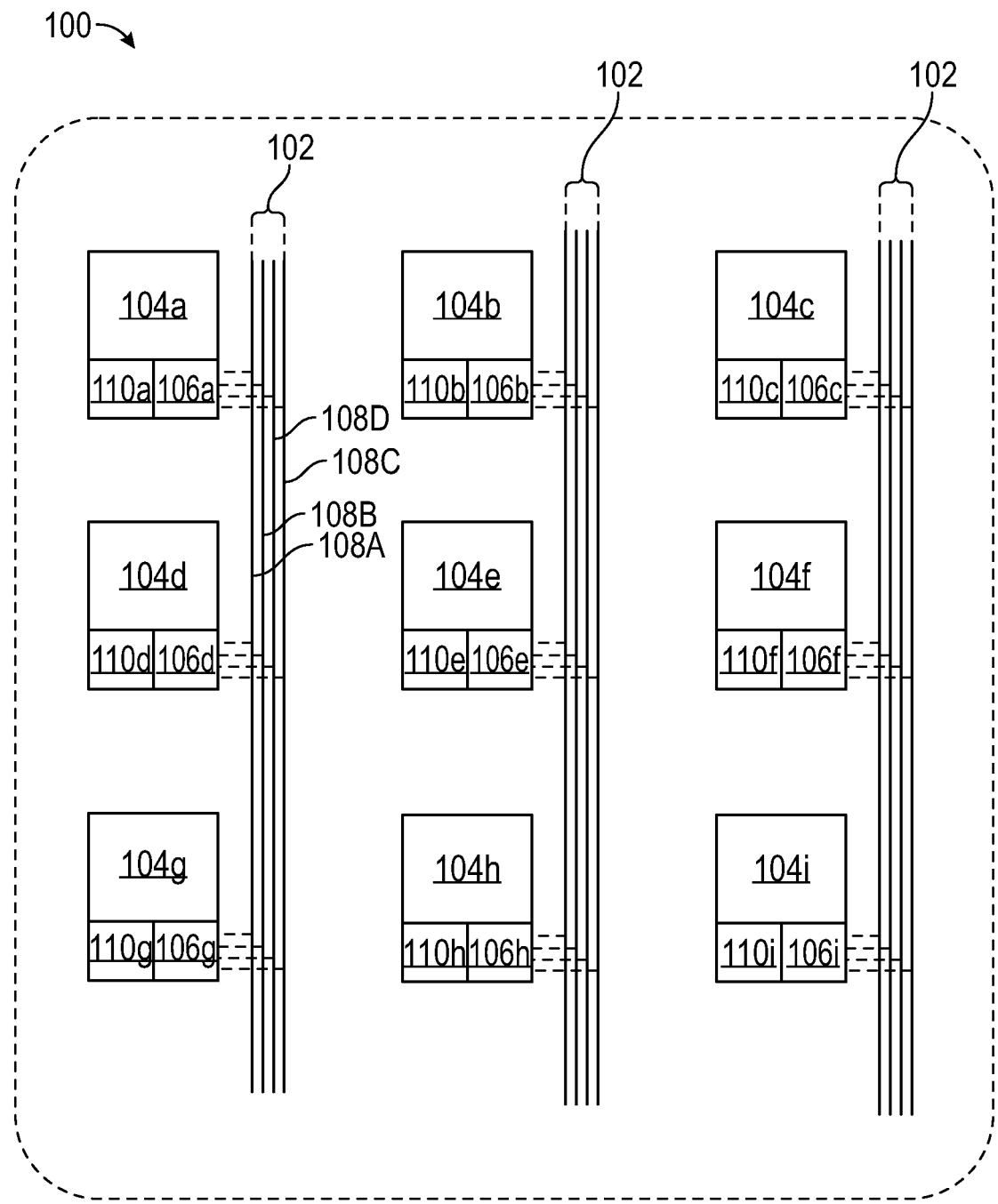
FIG. 1 is a diagram of an example photonic communication device (e.g., photonic network-on-chip device) configured with hardware-circuit level encryption in accordance with an illustrative embodiment.

FIG. 1 is a diagram of an example photonic communication device 100 configured with hardware-circuit level encryption in accordance with an illustrative embodiment. As shown, the photonic communication device 100 includes on-chip photonic links 102 that collectively form a network fabric to transfer data between on-chip components (e.g., cluster of processing cores 104, shown as 104a-104i) for inter-core communication. In some embodiments, the photonic links further facilitate core-to-component communication. Photonic communication device 100 can include integrated circuits having intra-die (within-die) or inter-die (i.e., die-to-die) photonic-based communication as well as systems of integrated circuits having chip-to-chip photonic-based communication. The photonic communication can include on-chip, off-chip, in-package, interposer-based photonic communication, and the like.

As shown in FIG. 1, each of the photonic links 102 are connected to gateway interfaces (GI) 106 that connects the photonic communication device components to the respective processing cores. The gateway interface 106 includes an electric driving circuit that drives a nearby microring-resonator that coupled to a given photonic signal transmission medium channel. Each gateway interface (e.g., 106a-106i) is coupled to an encryption circuit (e.g., 110a-110i) that facilitate encryption and decryption of the data signals transmitted through and received from the gateway interface 106.

Photonic signal transmission medium can include any free-space photonic communication medium including photonic-based waveguide such as optical fiber and rectangular or planar waveguides. Photonic signal transmission medium can include any medium or links that facilitates on-chip, off-chip, in-package, interposer-based photonic communication.

A gateway interface (GI) 106 connects the photonic communication device (e.g., PNoC device) to a cluster of processing cores. Each gateway interface in a photonic communication device is able to send and receive data in the optical domain on all of the utilized carrier wavelengths. Each gateway interface, in some embodiments, has a bank of modulator microring-resonators (i.e., modulator bank) and a bank of detector microring-resonators (i.e., detector bank). Each microring resonator in a bank can resonate with and operate on a specific carrier wavelength and, thus, can provide excellent wavelength selectivity of microring resonators and dense-wavelength-division-multiplexed (DWDM) capability of photonic signal transmission medium to enable high bandwidth parallel data transfers in photonic communication devices (e.g., PNoC devices).

The photonic link 102 is formed of one or more photonic signal transmission medium 108 (shown as 108a-108d). In some embodiments, the photonic communication device 100 includes optical switching elements (also referred to as routers) to facilitate switching of the photonic signals within the fabric. The photonic signal transmission medium 108 can support dense-wavelength-division-multiplexed (DWDM) wavelengths in which each wavelength serves as a data signal carrier.

Multiple data signals can be generated, via a bank of microring resonators at a source gateway-interface to modulate the data signals onto the multiple DWDM carrier wavelengths simultaneously. In some embodiments, multiple data signals are modulated onto the multiple DWDM carrier wavelengths simultaneously using a bank of modulator microring-resonators at the source gateway-interface. The data-modulated carrier wavelengths then traverse the photonic link 102 to a destination gateway-interface. An array of microring resonators serves as a detector to filter and drop the data signal on photodetectors to regenerate electrical data signals that are processed by the processing cores.

A DWDM-based photonic signal transmission medium of a photonic link, in some embodiments, uses a modulator bank (a series of modulator MRs) at the source gateway interface and a detector bank (a series of detector MRs) at the destination gateway. These photonic signal transmission medium, particularly photonic waveguides, are subject to being comprised as the link-level. DWDM-based photonic signal transmission medium can be broadly classified into four types: single-writer-single-reader (SWSR), single-writer-multiple-reader (SWMR), multiple-writer-single-reader (MWSR), and multiple-writer-multiple-reader (MWMR). As SWSR, SWMR, and MWSR photonic signal transmission medium are subsets of an MWMR photonic signal transmission medium.

Link-Level Security Concerns

Figure 2A:
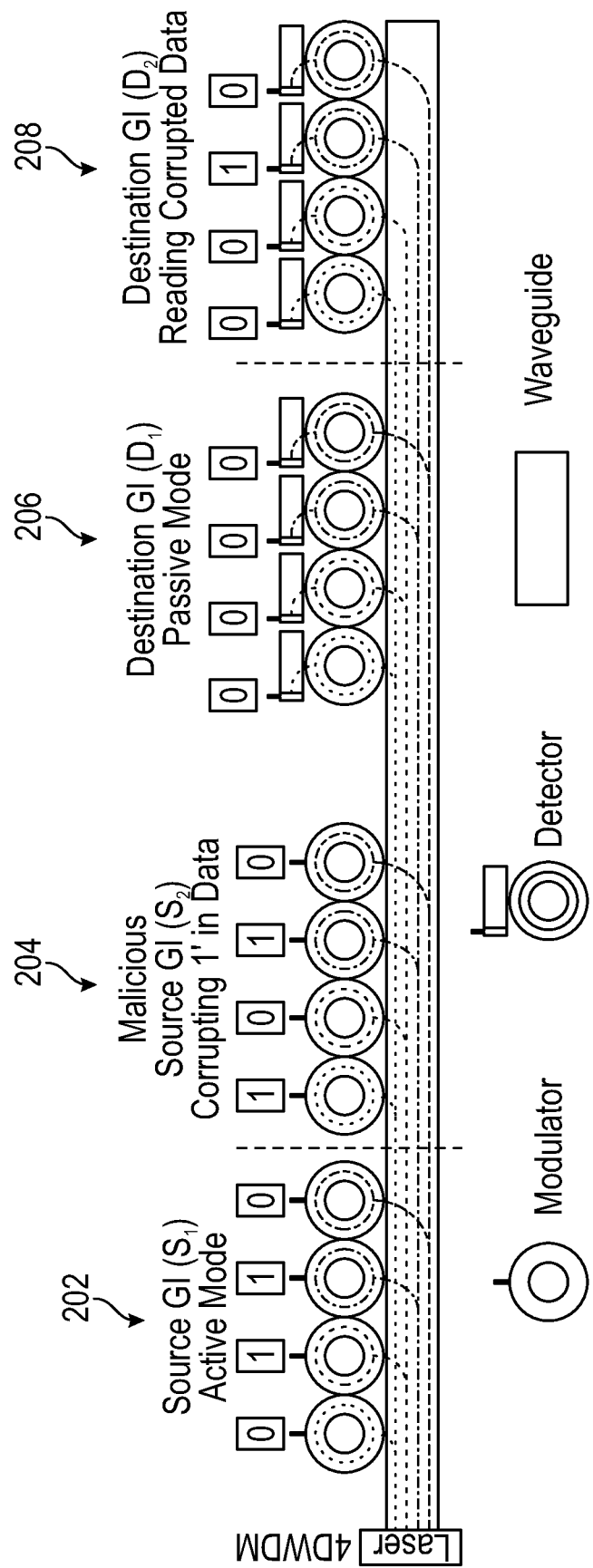
FIG. 2A shows a representation of a multiple-writer-multiple-reader (MWMR) photonic signal transmission medium with two source gateway-interfaces and two destination gateway-interfaces in which one of the source gateway-interfaces included is malicious.

FIG. 2A shows a multiple-writer-multiple-reader (MWMR) photonic signal transmission medium with two source gateway-interfaces (202, 204) and two destination gateway-interfaces (206, 208) in which one of the source gateway-interfaces 204 included is malicious. In a MWMR photonic signal transmission medium, multiple gateway interfaces connect the modulator banks of some gateway interfaces to the detector banks of the remaining gateway interfaces. Indeed, multiple gateway interfaces (e.g., source gateway-interfaces) can send data using their modulator banks, and multiple gateway interfaces (e.g., destination gateway-interfaces) can receive (read) data using their detector banks.

In FIG. 2A, the modulator bank 202 of source gateway-interface (shown as "$S_1$" 202) is sending data to the detector bank 208 of destination gateway-interface (shown as "$D_2$." 208). If a source gateway-interface ("$S_2$" 204) located in the communication path is malicious (e.g., includes a hardware trojan in its control logic), its modular bank can, e.g., modify the existing '1's in the data to '0's—leading to data corruption. As shown in FIG. 2A, gateway interface "$S_1$" 202 is intended to transmit data values of '0110' to gateway interface "$D_2$" 204, but because of data corruption by malicious gateway-interface "$S_2$" 204, the data value received by gateway interface "$D_2$" 208 is '0010'. The encryption module 110 may facilitate the correction of the data using parity or error correction code (ECC) bits in the data.

Figure 2B:
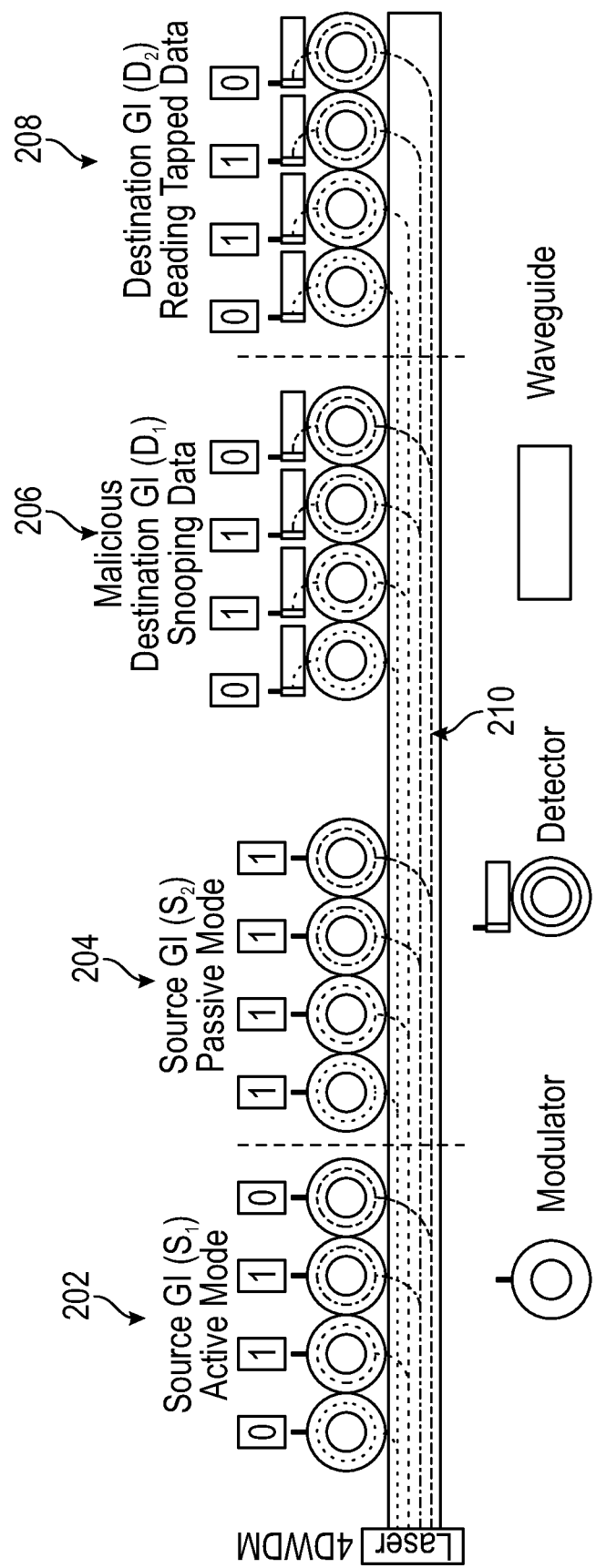
FIG. 2B shows a representation of a MWMR photonic signal transmission medium with two source gateway-interfaces and two destination gateway-interfaces in which one of the destination gateway-interfaces is a malicious source.

FIG. 2B shows a representation of a MWMR photonic signal transmission medium with two source gateway-interfaces (202, 204) and two destination gateway-interfaces (206, 208) in which one of the destination gateway-interfaces 204 is a malicious source. In FIG. 2B, the modulator bank 202 of source gateway-interface (shown as "$S_1$" 202) is sending data to the detector bank 208 of destination gateway-interface (shown as "$D_2$." 208). When destination gateway-interface "$D_1$" 206 located in the communication path is configured with a hardware trojan, its detector bank at gateway interface "$D_1$" 206 can be partially tuned to the utilized wavelength channels 210 and snoop data. In the example shown in FIG. 2B, the gateway interface "$D_1$" 206 snoops '0110' from the wavelength channels 210 that are being transmitted to the gateway interface "$D_2$" 208. The snooped data from "$D_1$" can be transferred to a malicious core within the chip-multiprocessors to determine sensitive information. This type of snooping attack from malicious destination gateway-interfaces can be hard to detect as it does not disrupt the intended communication among chip-multiprocessors cores. Indeed, there is a pressing need to address the security risks imposed by snooping gateway-interfaces in DWDM-based photonic communication architectures, particularly for PNoC devices.

Device-Level Security Concerns

Microring resonators can be compromised and manipulated by hardware trojan. Process variation (PV) can induce changes that can be undesirable in microring resonator. For example, variations in geometric features of the microring resonator (e.g., widths and heights) can shifts the resonance wavelength characteristics of the microring resonator. These variations can be remedied, e.g., using conventional localized trimming and thermal tuning methods. Localized trimming method typically entails injecting (or depleting) free carriers into (or from) the silicon core associated with the microring resonator by way of an electrical tuning circuit so as to reduce (or increase) the refractive index of the microring resonator (attributed to the electro-optic effect). Thermal tuning typically employs an integrated micro-heater to adjust the temperature and/or refractive index of a microring resonator for process variation remedy (e.g., attributed to the thermos-optic effect).

To allow data broadcast in photonic communication devices (e.g., PNoC devices), tuning circuits of detector microring-resonators can partially detune the microring-resonators from their resonance wavelengths such that a significant portion of the photonic signal energy in the data-carrying wavelengths continues to propagate in the photonic signal transmission medium, including photonic waveguide, to be absorbed in the subsequent detector microring-resonators. Techniques to counteract process-variation-induced resonance shifts in microring-resonators can involve retuning the resonance wavelengths by using carrier injection/depletion or thermal tuning, e.g., implemented through the microring-resonators tuning-circuits. Typically, the modulator microring-resonator and detectors use the same electro-optic effect (i.e., carrier injection/depletion) implemented through the same electrical tuning circuit as used for localized trimming, to move in and out of resonance (i.e., switch ON/OFF) with a wavelength. These electrical tuning circuit are susceptible to hardware trojan and, thus, malicious operation of modulator and detector microring-resonators are possible.

Indeed, a hardware trojan in the gateway-interface can manipulate these tuning circuits of detector microring-resonators to partially tune the detector MR to a passing wavelength in the photonic signal transmission medium including photonic waveguides, which enables snooping of the data that is modulated on the passing wavelength. Such covert data snooping is a serious security risk in photonic communication devices such as PNoCs.

Figure 3A:
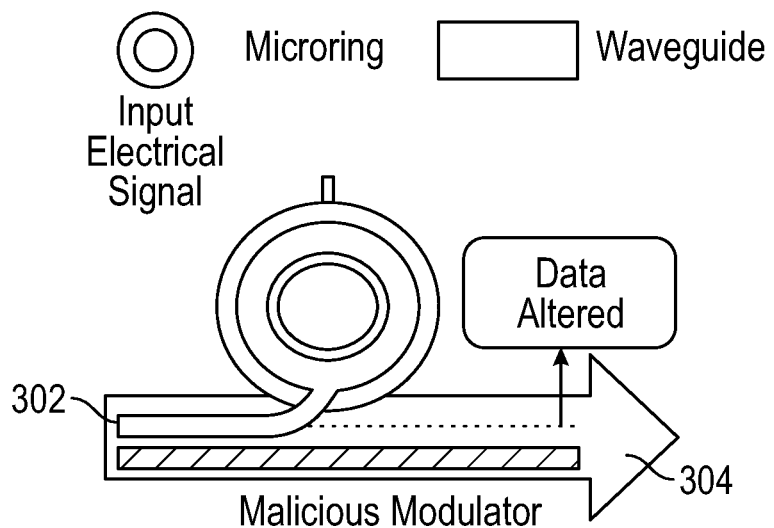
FIG. 3A is a diagram showing an operation of a malicious modulator microring-resonator.

FIG. 3A is a diagram showing an operation of a malicious modulator microring-resonator. As shown in FIG. 3A, a malicious modulator microring-resonator is partially tuned to a data-carrying wavelength (shown in 302) that is passing by in the photonic signal transmission medium 304. The malicious modulator microring resonator draws some power from the data-carrying wavelength, which can ultimately lead to data corruption as optical '1's in the data can lose significant power to be altered into '0's.

Figure 3B:
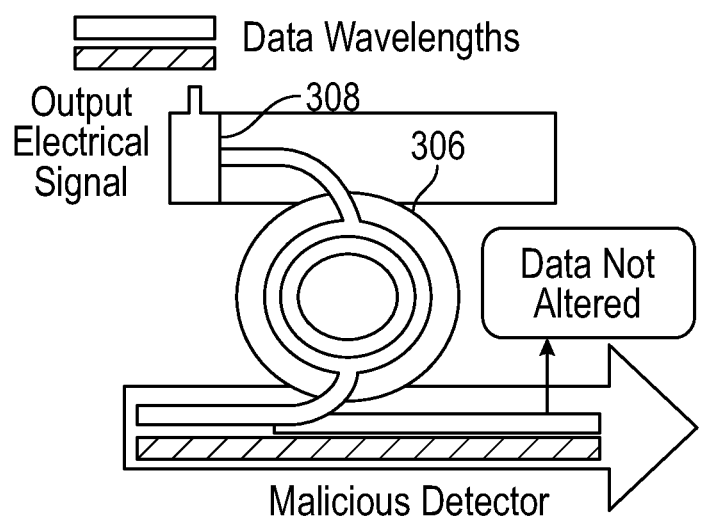
FIG. 3B is a diagram showing a malicious detector that can be partially tuned to a passing data-carrying wavelength, to filter only a small amount of its power and drop it on a photodetector for data duplication.

FIG. 3B is a diagram showing a malicious detector 306 that can be partially tuned to a passing data-carrying wavelength, to filter only a small amount of its power and drop it on a photodetector 308 for data duplication. This small amount of filtered power does not alter the data in the photonic signal transmission medium so that it continues to travel to its target detector for legitimate communication. Thus, malicious detector microring-resonators can snoop data from the photonic signal transmission medium without altering it, which is a major security threat in photonic links.

Indeed, the microring-resonator tuning-circuits that are used to support data broadcasts and address microring-resonator resonance shifts (e.g., due to process variations (PV)) can allow hardware Trojan to retune the microring-resonator for use in snooping attacks.

Figure 4:
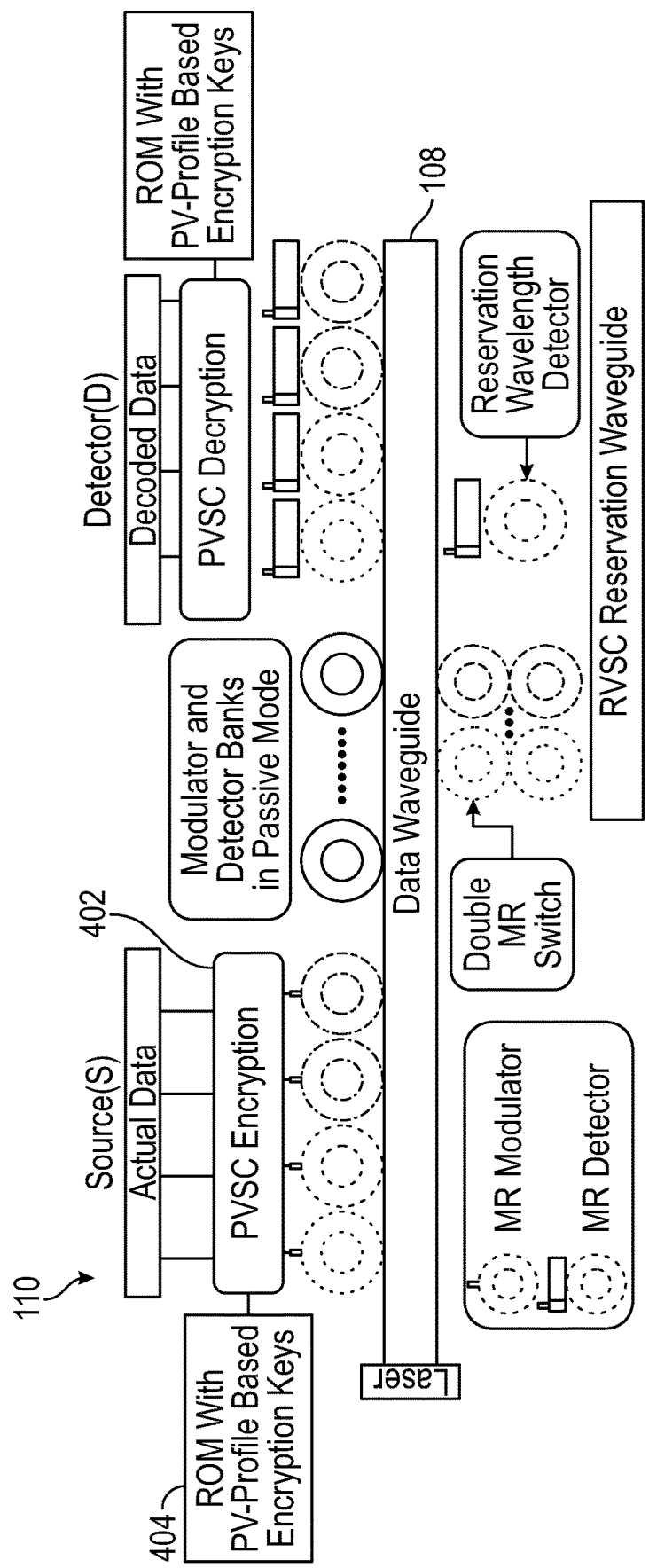
FIG. 4 is a diagram showing a high-level overview of a multi-approach framework to secure communication in DWDM-based photonic communication architectures (e.g., PNoC architectures) by integrating circuit-level and architecture-level enhancements in accordance with an illustrative embodiment.

SOTERIA Framework: A Multi-Approach Overview to Secure Communication in Photonics Communication Devices FIG. 4 is a diagram showing a high-level overview of a multi-approach framework to secure communication in DWDM-based photonic communication architectures (e.g., PNoC architectures) by integrating circuit-level and architecture-level enhancements in accordance with an illustrative embodiment.

In an aspect, an encryption module 110 is used as part of a circuit-level security feature to prevent a malicious destination gateway-interface from deciphering snooped data. The encryption module 110 comprises an encryption circuitry 402 that couples to a ROM 404 that stores encryption keys. Indeed, because the identity of the snooping gateway-interface is unknown, it is challenging to determine whether the encryption key of a destination gateway-interface should be shared.

In some embodiments, a unique encryption key that is specific to the destination gateway-interface is used. The key is available only to a transmitting gateway-interface and is not shared among other destination gateway-interface (e.g., to limit the opportunity for the key to be compromised).

In some embodiments, the process variation profile of a gateway interface associated with a photonic signal transmission medium 108 is used to form the encryption key for transmission over the photonic signal transmission medium. In some embodiments, the process variation profile associated with the detector microring-resonator of the destination gateway-interface is used to form the encryption key to encrypt data before it is transmitted via the photonic signal transmission medium. The circuit-level security feature can be used to protect data from snooping gateway-interfaces, if knowledge about the target destination gateway-interface or the source of the encryption key is unknown.

In another aspect, to further enhance security, an architecture-level reservation-assisted security enhancement (RVSC) scheme is used. The reservation-assisted security measure uses a separate and distinct secure reservation photonic signal transmission medium to reduce the likelihood of detection of the destination gateway-interface by snooping gateway-interfaces. The architecture-level reservation-assisted security enhancement scheme can be used in combination, or independent, of the circuit-level security feature. Each of which are now discussed.

Process-Variation-Based Encryption

Figure 5:
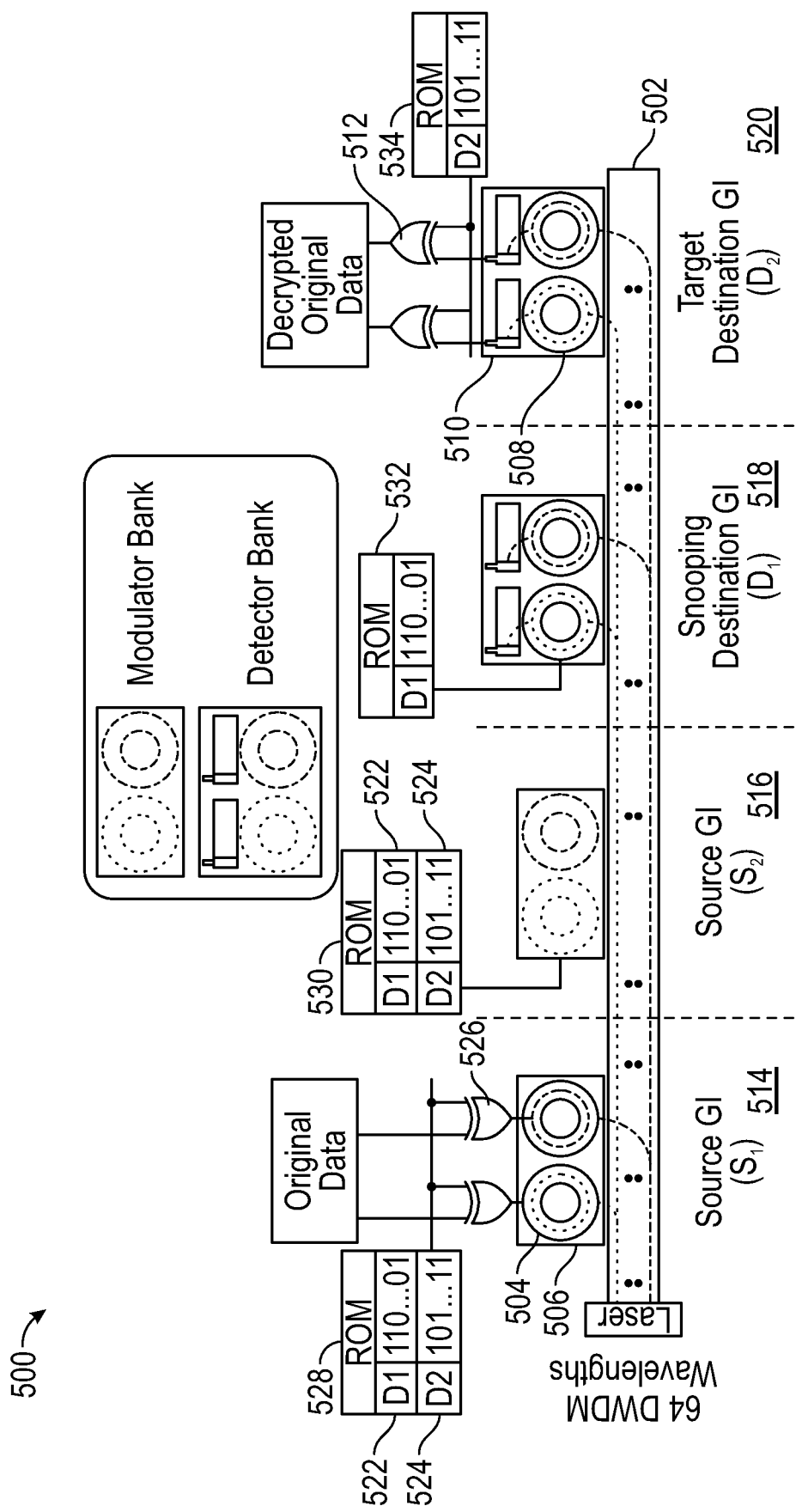
FIG. 5 is a diagram of a circuit-level process-variation-based encryption system, in accordance with an illustrative embodiment.

FIG. 5 is a diagram of a circuit-level process-variation-based encryption system 500, in accordance with an illustrative embodiment. The circuit-level process-variation-based encryption system 500 facilitates the generation of unclonable encryption keys using the process variation profiles of the microring resonator for a destination gateway-interface, for example, to generate a unique encryption key for each detector bank of each MWMR photonic signal transmission medium in a photonic communication device.

Process variation can induce random shifts in the resonance wavelengths of the microring resonator used in a photonic communication device. These resonance shifts can be in the range from about −3 nm to about 3 nm, in some embodiments. Indeed, the microring resonator that belong to different gateway interfaces in a photonic communication device can have different process variation profiles. Indeed, microring resonators of a different bank for a same gateway interface can have different process-variation profiles. Because of its random nature, the microring resonator process-variation profiles cannot be cloned by a malicious gateway-interface.

In some embodiments, the encryption keys are generated during the testing phase of the chip-multiprocessors chip following fabrication of the chip. In some embodiments, a dithering signal is used based on in-situ method to generate an anti-symmetric analog error signal for each detector microring-resonators of every detector bank in which the signal is proportional to the process-variation-induced resonance shift in the detector microring-resonator. Further description of the dithering signal is described in K. Padmaraju et al., "Wavelength Locking and Thermally Stabilizing Microring Resonators Using Dithering Signals," JLT, 32(3) (2013), which is incorporated by reference herein in its entirety. Then, the analog error signal is converted into a digital signal (e.g., 64-bit, 128-bit, 256-bit, etc.). The conversion circuit may be located on the chip-multiprocessors chip or it may be located on an external platform.

As shown in FIG. 5, a 64-bit digital error signal is generated for every detector microring-resonator 508 of each detector bank 510. In FIG. 5, a 64-DWDM-wavelengths-per-photonic signal transmission medium 502 has 64 detector microring resonators (e.g., 504) in every detector bank 506 and 64 modulator microring-resonators (e.g., 508) in every modulator bank 510. For each detector bank (510), 64-XOR-circuits (512) are included to perform XOR operations on the 64-digital-error signals (of 64 bits each) from each of the 64 detector microring-resonator 508 to create a unique 64-bit encryption key. In some embodiments, the same anti-symmetric error signals is used to control the carrier injection and heating of the microring resonators to remedy the process-variation-induced shifts in their resonances.

To further demonstrate how the 64-bit encryption key is used to encrypt data in photonic links, consider in FIG. 5 which depicts an example photonic link that has one MWMR photonic signal transmission medium 502 and connects the modulator banks of two source gateway-interfaces ("$S_1$" 514 and "$S_2$" 516) with the detector banks of two destination gateway-interfaces ("$D_1$" 518 and "$D_2$" 520). As there are two destination gateway-interfaces (e.g., 518, 520) on this link 502, two 64-bit encryption keys (522, 524) are created corresponding to each of the destination gateway-interfaces. The two encryption keys (522, 524) are stored at the source gateway-interfaces (514, 516). When data is to be transmitted by a source gateway-interface (e.g., 514 or 516), the key for the appropriate destination is used to encrypt data at the flit-level granularity, e.g., by performing an XOR operation (e.g., by XOR circuit 526) between the key and the data flit. This requires that the size of an encryption key matches the data flit size. For a data flit size of 512 bits, a 512-bit encryption key can be generated from appending the stored 64-bit encryption key eight times to itself.

In some embodiments, the source gateway-interface (e.g., 514, 516) stores two 512-bit encryption keys (for destination gateway-interface "$D_1$" 518 and "$D_2$" 520) in its local ROM (528, 530), whereas every destination gateway-interface (e.g., 518 or 520) stores only its corresponding 512-bit key in its ROM (e.g., 532, 534). By storing a key having a length corresponding to the data flit size (e.g., a 512-bit keys instead of the 64-bit keys), latency overhead of affixing the 64-bit keys to generate 512-bit keys can be eliminated. Indeed, when source gateway-interface "$S_1$" 514 intends to send a data flit to destination gateway-interface "$D_2$" 520, then source gateway-interface "$S_1$" 514 first accesses the 512-bit encryption key 522 corresponding to the destination gateway-interface "$D_2$" 520 from its local ROM 528 and XORs the data flit with this key in one cycle, and then transmits the encrypted data flit over the link 502. As the link 502 employs only one photonic signal transmission medium with 64 DWDM wavelengths, the encrypted 512-bit data flit is therefore transferred on the link 502 to the destination gateway-interface "$D_2$" 520 in eight cycles. At the destination gateway-interface "$D_2$" 520, the received data flit is decrypted by an XOR operation with the 512-bit key corresponding to the destination gateway-interface "$D_2$" 520 from the local ROM 534. Indeed, even if a snooping gateway-interface "$D_1$" 518 snoops the data intended for the destination gateway-interface "$D_2$" 520, it cannot decipher the data as it does not have access to the correct key (corresponding to the destination gateway-interface "$D_2$" 520) for decryption.

It is noted that other methods of generating encryption key can be used to generate a unique encryption key for each destination gateway-interface to which the keys are distributed among potential source gateway-interfaces so long as the encryption key is generated as part of the original design of the destination gateway-interface and the encryption key is generated using an unclonable phenomenon (e.g., that is specific to the original design of the corresponding gateway interface). Because the keys are part of the original design, they would be less susceptible to cloning by hardware trojan types of compromise.

The encryption module 110 can protect data from being deciphered by a snooping gateway-interface when (i) the snooping gateway-interface does not know the target destination gateway-interface for the snooped data, and (ii) the snooping gateway-interface cannot access the encryption key corresponding to the target destination gateway-interface.

Reservation-Assisted Security Enhancement

To further secure the target destination gateway-interface for a given data, separating the target destination information on a separate and distinct wavelength can facilitate the concealment of the target destination information. In photonics communication devices, such as photonic network-on-chip devices, that use photonic links with multiple destination gateway-interfaces, data is typically transferred in two time-division-multiplexed (TDM) slots—a reservation slot and a data slot—over the same photonic signal transmission medium to minimize hardware circuitries. To enable reservation of the photonic signal transmission medium, each destination is assigned a reservation selection wavelength.

For instance, consider the photonic link in FIG. 5. If both source gateway interface "$S_1$" 516 and destination gateway-interface "$D_1$" 518 are compromised, then the hardware trojan in the "$S_1$" control unit can access the encryption keys corresponding to both the destination gateway-interfaces "$D_1$" 518 and "$D_2$" 520 from its ROM and transfer them to a malicious core (a core running a malicious program). Moreover, the hardware trojan in the D1 control unit can snoop the data intended for destination gateway-interface $D_2$" 520 and transfer it to the malicious core. Thus, the malicious core may have access to the snooped data as well as the encryption keys stored at the source gateway-interfaces. Nevertheless, accessing the encryption keys stored at the source gateway-interfaces is not sufficient for the malicious gateway-interface (or core) to decipher the snooped data. This can be because the compromised ROM typically has multiple encryption keys corresponding to multiple destination gateway-interfaces, and choosing a correct key that can decipher data requires the knowledge of the target destination gateway-interface. Thus, the example PVSC encryption scheme can facilitate the securing of data communication in photonic communication devices, including PNoC devices, as long as the malicious gateway-interfaces (or cores) do not know the target destinations of the snooped data.

Because many photonic communication architectures (including PNoC architectures) employ photonic links with multiple destination gateway interfaces that utilize the same photonic signal transmission medium to transmit both the target destination information and actual data, if a malicious gateway-interface manages to tap the target destination information from the shared photonic signal transmission medium, then it can access the correct encryption key from the compromised ROM to decipher the snooped data. Thus, there is a need to conceal the target destination information from malicious gateway-interfaces (cores).

Figure 6:
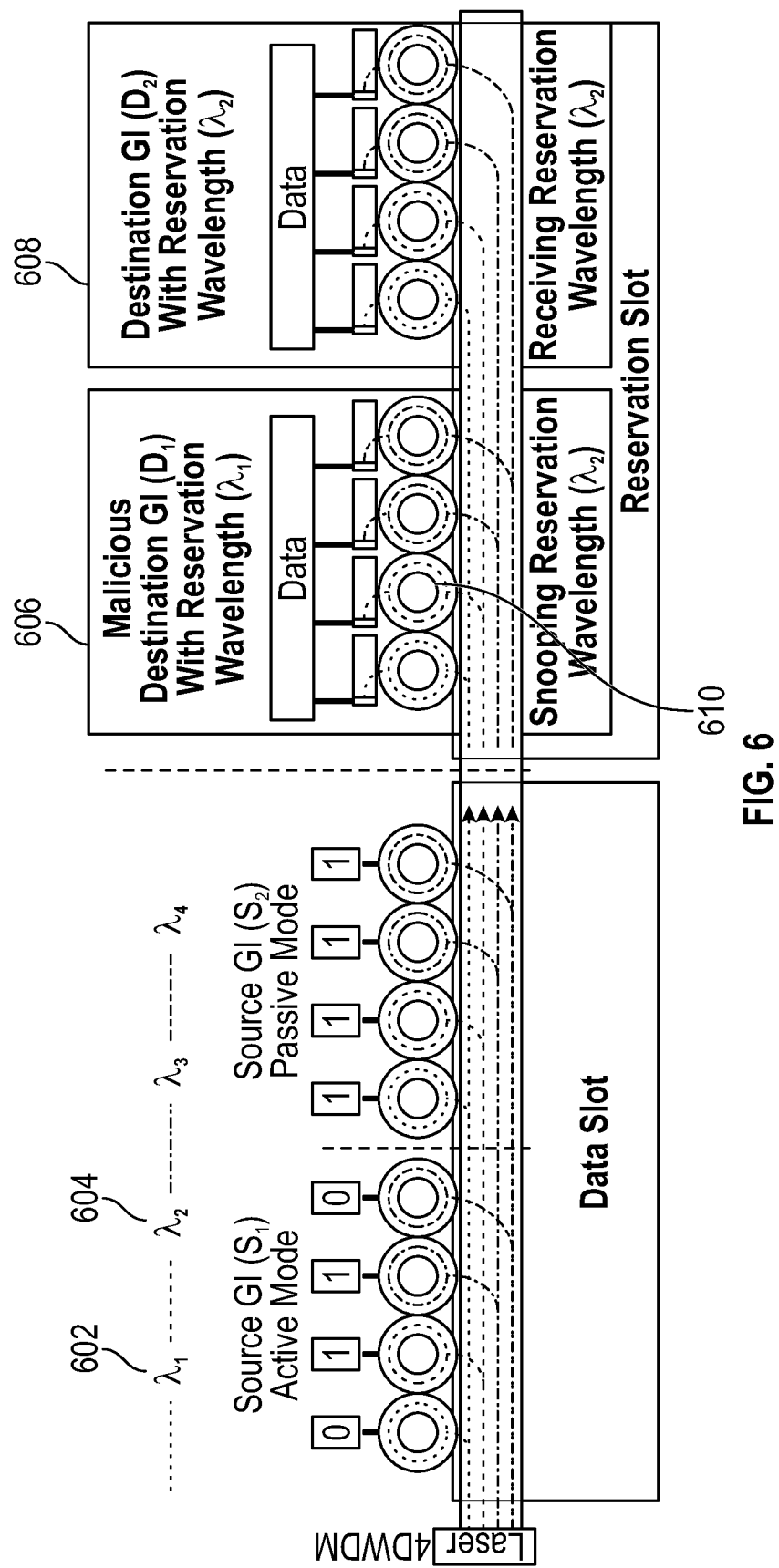
FIG. 6 is a diagram showing a malicious detector that can be partially tuned to a passing data-carrying photonic signal (e.g., photonic wavelength), to filter only a small amount of its power and drop it on a photodetector for reservation wavelength snooping.

FIG. 6 is a diagram showing a malicious detector that can be partially tuned to a passing data-carrying wavelength, to filter only a small amount of its power and drop it on a photodetector for reservation wavelength snooping. In FIG. 6, reservation selection wavelengths "$\lambda_1$" 602 and "$\lambda_2$" 604 correspond to destination gateway-interfaces "$D_1$" 606 and "$D_2$" 608, respectively. When a destination gateway-interface detects its reservation selection wavelength in the reservation slot, the gateway-interface switches "on" its detector bank to receive data in the next data slot, in some implementations. But, in the presence of a hardware trojan, a malicious gateway-interface can snoop signals from the reservation slot using the same detector bank that is used for data reception. As shown in FIG. 6, a malicious gateway-interface "$D_1$" 606 uses one of its detectors 610 to snoop wavelengths "$\lambda_2$" 604 from the reservation slot. By snooping $\lambda_2$, the malicious gateway-interface "$D_1$" 606 can identify that the data it will snoop in the subsequent data slot will be intended for destination gateway-interface "$D_2$" 608.

Figure 7:
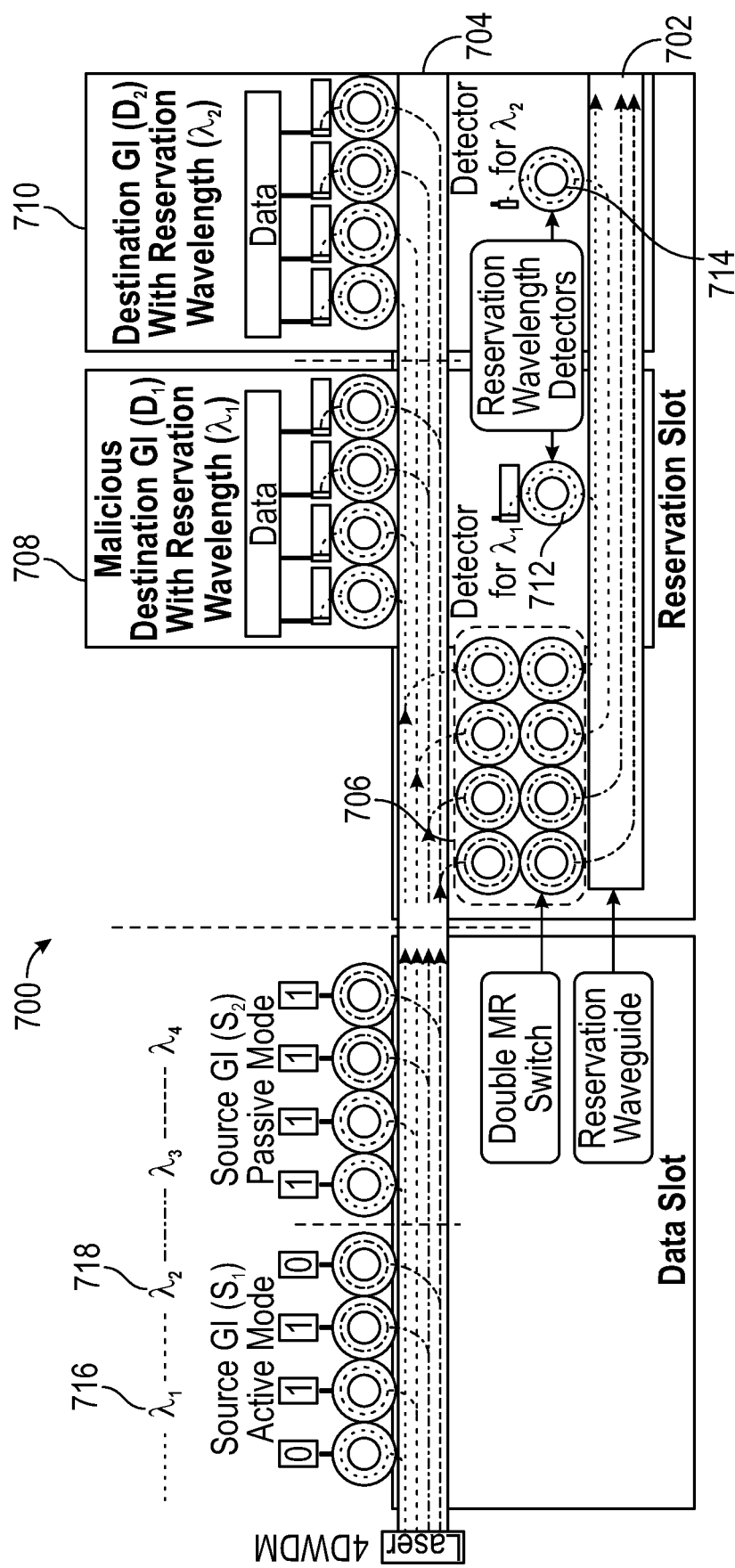
FIG. 7 is a diagram of an architecture-level reservation-assisted security enhancement (RVSC) scheme that addresses the security risk discussed in FIG. 6, in accordance with an illustrative embodiment.

FIG. 7 is a diagram of an architecture-level reservation-assisted security enhancement (RVSC) scheme 700 that address the security risk discussed in FIG. 6, in accordance with an illustrative embodiment. In FIG. 7, a reservation photonic signal transmission medium 702 is provided to carry reservation slots. The reservation photonic signal transmission medium 702 is separate and distinct from a data photonic signal transmission medium 704, which carries data slots. In some embodiments, and as shown in FIG. 7, a double microring-resonator 706 is used to switch the signals associated with the reservation slots from the data photonic signal transmission medium 704 to the reservation photonic signal transmission medium 702. The double microring resonator 706 (rather than a single microring resonator) serves as a switch and further ensures that the switched signals do not reverse their propagation direction after switching.

Further description of the double microring resonator is provided in Chittamuru et al., "HYDRA: Heterodyne Crosstalk Mitigation with Double Microring Resonators and Data Encoding for Photonic NoCs," TVLSI, vol. 26, no. 1 (2018), which is incorporated by reference herein in its entirety. Further, compared to single microring-resonator, double microring-resonators have lower signal loss due to steeper roll-off of their filter responses.

Referring still to FIG. 7, the double microring-resonators 706 are switched "on" only when transmission in the photonic link corresponds to a reservation slot, otherwise the double microring-resonators 706 are switched "off" to let the signals of the data slot pass by in the data photonic signal transmission medium 704. Furthermore, each destination gateway-interface has only one detector on the reservation photonic signal transmission medium that corresponds to its receiver selection wavelength. In FIG. 7, destination gateway-interfaces "D1" 708 and "D2" 710 have detectors (712, 714) corresponding to their reservation selection wavelengths "$\lambda_1$" 716 and "$\lambda_2$" 718, respectively, on the reservation photonic signal transmission medium 702. Because the malicious gateway-interface "$D_1$" 708 does not have a detector corresponding to the wavelength "$\lambda_2$" 718, it could not snoop wavelength "$\lambda_2$" 718 from the reservation slot. The large number of utilized reservation wavelengths would make it difficult to retune a given detector to match that of the transmitted wavelengths.

Experimental Results

The exemplified methods and systems have been characterized on two popular PNoC architectures: Firefly and Flexishare, both of which use DWDM-based photonic waveguides for data communication. The Firefly PNoC was configured with 8×8-SWMR crossbar, and the Flexishare PNoC was configured with a 32×32-MWMR crossbar with 2-pass token stream arbitration. The signal power loss and required laser power were model for the modified SOTERIA-enhanced Firefly and Flexishare PNoCs. At each source and destination gateway-interface of the SOTERIA-enhanced Firefly and Flexishare PNoCs, XOR gates are included facilitate the parallel encryption and decryption of a 512-bit data flits. The additional circuitry adds a 1-cycle delay overhead for encryption and decryption of every data flit. The overall laser power and delay over-heads for both PNoCs are quantified.

Firefly PNoC:

Firefly PNoC is a 256-core system having 8 clusters (C1-C8) with 32 cores in each cluster. Firefly uses reservation-assisted SWMR data channels in its 8×8-crossbar for inter-cluster communication. Each data channel consists of 8 SWMR waveguides with 64 DWDM wavelengths in each waveguide.

The SOTERIA-enhanced Firefly was modified to include a reservation waveguide at every SWMR channel. The added reservation waveguide has 7 detector microring resonators to detect reservation selection wavelengths corresponding to 7 destination gateway-interfaces. Furthermore, 64 double microring-resonators corresponding to 64 DWDM wavelengths are added at each reservation waveguide to implement the reservation-assisted scheme. Each source gateway-interface has a ROM with seven entries of 512 bits each to store seven 512-bit encryption keys corresponding to seven destination gateway-interfaces. Each destination gateway-interface also has a 512-bit ROM to store its own encryption key.

Flexishare PNoC:

The evaluated Flexishare PNoC architecture includes 256 cores with a 64-radix 64-cluster Flexishare PNoC with four cores in each cluster and 32 data channels for inter-cluster communication. Each data channel has four MWMR waveguides with each having 64 DWDM wavelengths. In SOTERIA-enhanced Flexishare, a reservation waveguide is included for each MWMR channel. Each reservation waveguide has 16 detector microring-resonators to detect reservation selection wavelengths corresponding to 16 destination gateway-interfaces. Each source gateway-interface includes a ROM with 16 entries of 512 bits each to store the encryption keys, and each destination gateway-interface includes a 512-bit ROM.

Evaluation Setup:

To evaluate our SOTERIA (PVSC+RVSC) security enhancement framework for DWDM-based PNoCs, modeling- and simulation-based analysis of the SOTERIA-enhanced Firefly and Flexishare PNoCs were performed. The analysis were performed using a cycle-accurate SystemC based NoC simulator, for a 256-core single-chip architecture at 22 nm. The simulator were validated with respect to power dissipation and energy consumption based on results obtained from the DSENT tool. Real-world traffic were used from the PARSEC benchmark suite. GEMS full-system simulation of parallelized PARSEC applications was used to generate traces that were fed into the NoC simulator. A "warmup" period of 100 million instructions were set-up and then traces were captured for the subsequent 1 billion instructions. The traces were extracted from parallel regions of execution of PARSEC applications. Geometric calculations were performed (for a 20 mm×20 mm chip size) to determine lengths of SWMR and MWMR waveguides in Firefly and Flexishare. Based on the analysis, the time needed for light to travel from the first to the last node was estimated as 8 cycles at 5 GHz clock frequency. The VARIUS tool was adapted to model random and systematic die-to-die (D2D) as well as within-die (WID) process variations in MRs for the Firefly and Flexishare PNoCs for the 512-bit packet size.

The static and dynamic energy consumption values for electrical routers and concentrators in Firefly and Flexishare PNoCs were determined based on results from DSENT. The area, power, and performance overheads were modeled as follows. Modified Firefly and Flexishare PNoCs had an electrical area overhead of 12.7 $mm^2$ and 3.4 $mm^2$, respectively, and power overhead of 0.44 W and 0.36 W, respectively, using gate-level analysis and CACTI 6.5 tool for memory and buffers. The photonic area of modified Firefly and Flexishare PNoCs was 19.83 $mm^2$ and 5.2 $mm^2$, respectively, and derived based on the physical dimensions of the waveguides, microring-resonators, and splitters. For energy consumption of photonic devices, model parameters included 0.42 pJ/bit for every modulation and detection event and 0.18 pJ/bit for the tuning circuits of modulators and photodetectors. The microring resonator trimming power was 130 µW/nm for current injection and tuning power is 240 µW/nm for heating.

Overhead Analysis of SOTERIA on PNoCs:

The first set of experiments compared the baseline (without any security enhancements) Firefly and Flexishare PNoCs with the modified SOTERIA-enhanced variants. All 8 SWMR waveguide groups of the Firefly PNoC and all 32 MWMR waveguide groups of the Flexishare PNoC were equipped with PVSC encryption/decryption and reservation waveguides for the RVSC scheme. An analytical model was developed to calculate the total signal loss at the detectors of the worst-case power loss node (NWCPL), which corresponds to router C4R0 for the Firefly PNoC and node R63 for the Flexishare PNoC.

Figure 8A:
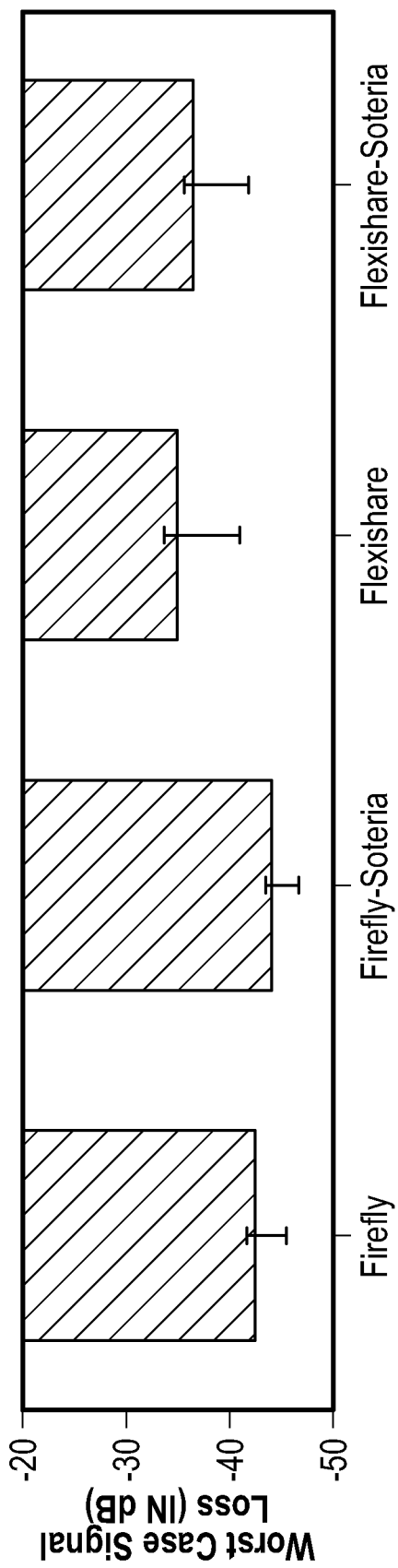
FIG. 8A is a chart summarizing the worst-case signal loss results for the baseline- and SOTERIA-configurations between the two PNoC architectures.
Figure 8B:
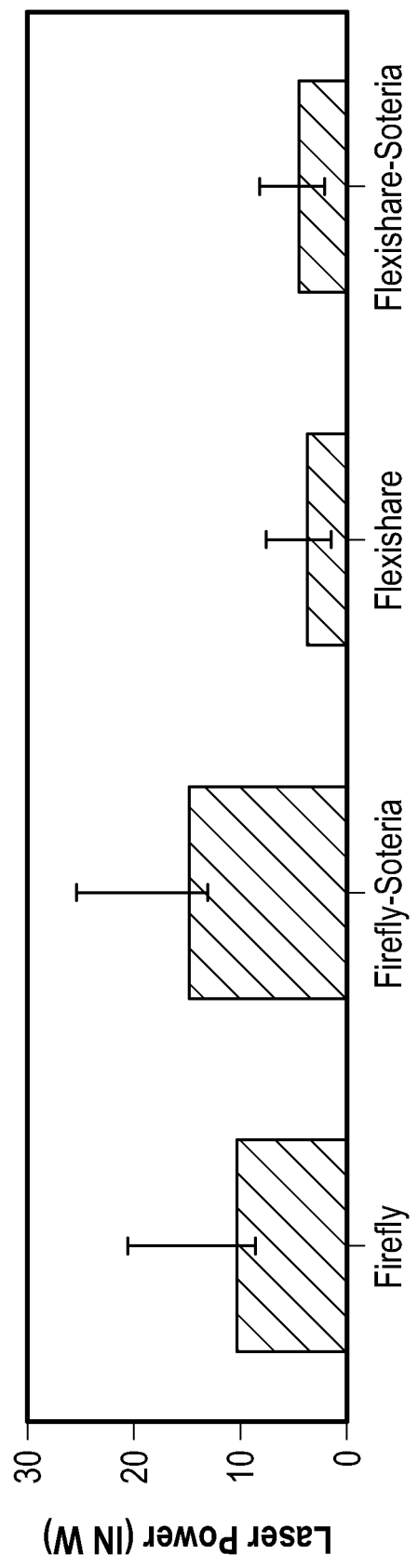
FIG. 8B is a chart summarizing power dissipation results between the baseline- and the SOTERIA-configuration for the two PNOC architectures

FIG. 8A is a chart summarizing the worst-case signal loss results for the baseline- and SOTERIA-configurations between the two PNoC architectures. FIG. 8B is a chart summarizing power dissipation results between the baseline- and the SOTERIA-configuration for the two PNOC architectures. In FIG. 8A, it is observed that Firefly PNoC configured with SOTERIA had an increased loss by 1.6 dB and a Flexishare PNoC configured with SOTERIA had an increased loss by about 1.2 dB on average, as compared to their respective baselines. Compared to the baseline PNoCs that have no single- or double-MRs to switch the signals of the reservation slots, the double MRs used in the SOTERIA-enhanced PNoCs performed switching of the wavelength signals of the reservation slots, leading to the increase in losses in the waveguides, which increased the worst-case signal losses in the SOTERIA-enhanced PNoCs. Using the worst-case signal losses shown in FIG. 8A, the total photonic laser power and corresponding electrical laser power was determined between the baseline and SOTERIA-enhanced variants of Firefly and Flexishare PNoCs, shown in FIG. 8B. In FIG. 8B, the Firefly and Flexishare PNoCs with SOTERIA had a laser power overhead increase of 44.7% and 31.40% on average, compared to their baselines.

Figure 9A:
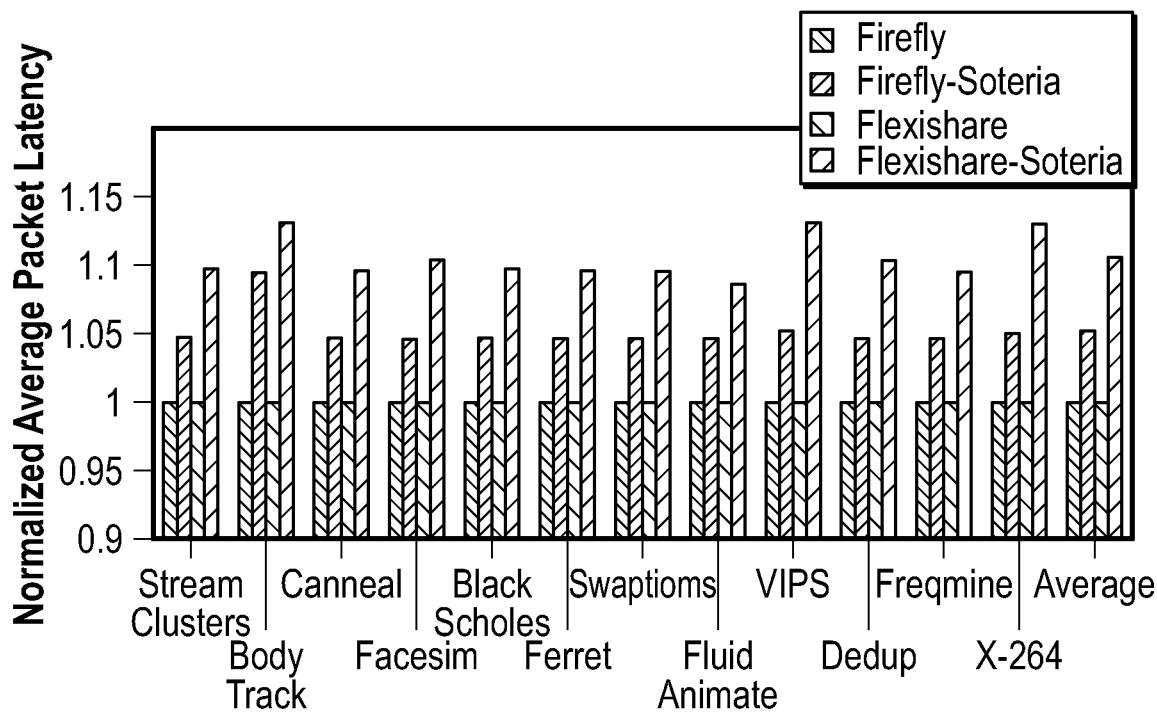
FIGS. 9A and 9B presents detailed simulation results that quantify the average packet latency and energy-delay product (EDP) for the two configurations of the Firefly and Flexishare PNoCs.
Figure 9B:
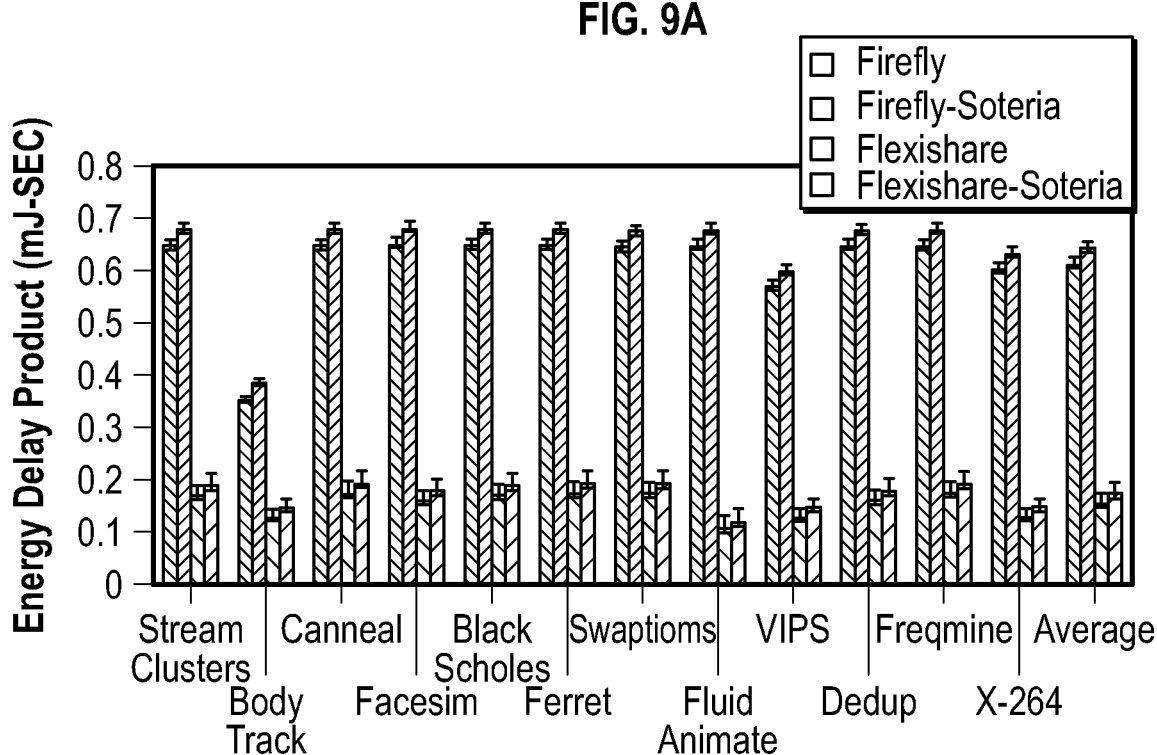

FIGS. 9A and 9B present detailed simulation results that quantify the average packet latency and energy-delay product (EDP) for the two configurations of the Firefly and Flexishare PNoCs. Specifically, FIG. 9A is a chart that shows summaries of a normalized average latency results between the baseline- and the SOTERIA-configuration for the two PNOC architectures. FIG. 9B is a chart that shows summaries energy-delay product (EDP) comparison between different variants of Firefly and Flexishare PNoCs that include their baselines and their variant with SOTERIA framework, for PARSEC benchmarks. Latency results are normalized with their respective baseline architecture results. Bars represent mean values of average latency and EDP for 100 PV maps; confidence intervals show variation in average latency and EDP across PARSEC benchmarks.

Results are shown for twelve multi-threaded PARSEC benchmarks. In FIG. 9A, it is observed that Firefly with SOTERIA had 5.2% higher latency on average compared to their respective baselines and Flexishare with SOTERIA had 10.6% higher latency. The additional delay due to encryption and decryption of data with PVSC may be contributed, in part, to the increase in average latency.

From the results for EDP shown in FIG. 9B, Firefly with SOTERIA had 4.9% higher EDP on average compared to their respective baselines, and Flexishare with SOTERIA had 13.3% higher EDP. Increased in EDP for the SOTERIA-enhanced PNoCs may not only due to the increase in their average packet latency and may also be due to the presence of additional RVSC reservation waveguides, which may have increased the required photonic hardware (e.g., more number of MRs) in the SOTERIA-enhanced PNoCs. This in turn may have increased static energy consumption (i.e., laser energy and trimming/tuning energy), ultimately increasing the EDP.

Analysis of Overhead Sensitivity:

A set of evaluations was performed to assess the overhead of SOTERIA changes with varying levels of security in the network. Typically, in a many-core system, only a certain portion of the data that contains sensitive information (i.e., keys) and only a certain number of communication links need to be secure. For the analysis, only a certain number channels were secured using SOTERIA. Out of the total 32 MWMR channels in the Flexishare PNoC, 4 (FLEX-ST-4), 8 (FLEX-ST-8), 16 (FLEX-ST-16), and 24 (FLEX-ST-24) channels were secured, and the average packet latency and EDP for these variants of the SOTERIA-enhanced Flexishare PNoC were evaluated.

Figure 10A:
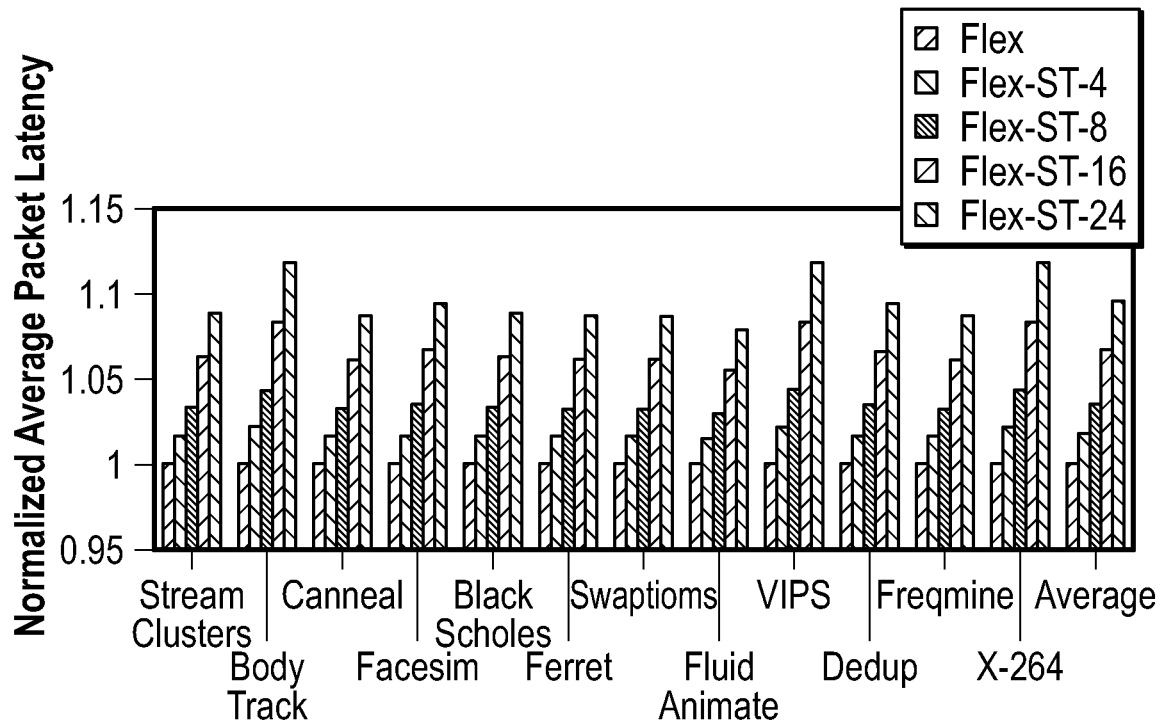
FIGS. 10A and 10B show normalized latency and energy-delay product (EDP) simulation results for the two configurations of the Firefly and Flexishare PNoCs.
Figure 10B:
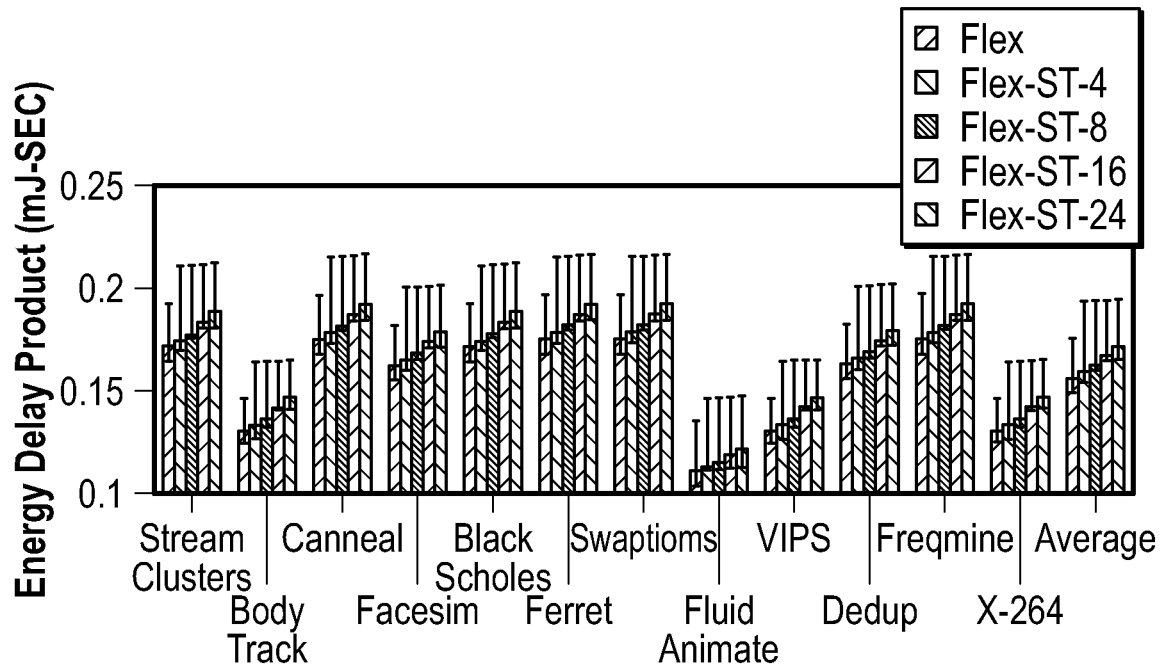

FIGS. 10A and 10B show normalized latency and energy-delay product (EDP) simulation results for the two configurations of the Firefly and Flexishare PNoCs. In particular, FIGS. 10A and 10B show normalized latency and energy-delay product (EDP) comparison between Flexishare baseline and Flexishare with 4, 8, 16, and 24 SOTERIA enhanced MWMR waveguide groups, for PARSEC benchmarks. Latency results were normalized to the baseline Flexishare results.

In FIGS. 10A and 10B, the average packet latency and EDP values are presented for the five SOTERIA-enhanced configurations of the Flexishare PNoC. In FIG. 10A, FLEX-ST-4, FLEX-ST-8, FLEX-ST-16, and FLEX-ST-24 was observed to have 1.8%, 3.5%, 6.7%, and 9.5% higher latency on average compared to the baseline Flexishare. Increase in number of SOTERIA-enhanced MWMR waveguides increased the number of packets that were transferred through the PVSC encryption scheme, which may have contributed to the increase in average packet latency across these variants. From the results in FIG. 8(b), FLEX-ST-4, FLEX-ST-8, FLEX-ST-16, and FLEX-ST-24 had 2%, 4%, 7.6%, and 10.8% higher EDP on average compared to the baseline Flexishare. EDP in Flexishare PNoC increased with increases in the number of SOTERIA enhanced MWMR waveguides. Increase in average packet latency and signal loss due to the higher number of reservation waveguides and double mirroring resonators may have contributed to the increase in the overall EDP across the assessed variants.

DISCUSSION

The presence of security threats in ENoCs have been known and solutions have been proposed to mitigate them. In M. Ancajas, K. Chakraborty, and S. Roy, "Fort-NoCs: Mitigating the Threat of a Compromised NoC," in Proc. DAC, 2014, a three-layer security system approach was proposed that uses data scrambling, packet certification, and node obfuscation to enable protection against data snooping attacks. A symmetric-key based cryptography design was presented in C. H. Gebotys and R. J. Gebotys, "A framework for security on NoC technologies," in Proc. ISVLSI, February 2003 for securing the NoC. In H. K. Kapoor, G. B. Rao, S. Arshi, and G. Trivedi, "A Security Framework for NoC Using Authenticated Encryption and Session Keys," in CSSP, 2013, a framework was proposed that uses permanent keys and temporary session keys for NoC transfers between secure and non-secure cores. Three different mechanisms to protect hybrid circuit-packet switched ENoC routers from timing channel attacks were presented in A. K. Biswas, "Efficient Timing Channel Protection for Hybrid (Pack-et/Circuit-Switched) Network-on-Chip," in IEEE TPDS, vol. 29, no. 5, pp. 1044-1057, 2018. In S. Das, K. Basu, J. R. Doppa, P. P. Pande, R. Karri, and K. Chakrabarty, "Abetting Planned Obsolescence by Aging 3D Networks-on-Chip," in Proc. NOCS, October 2018], a security analysis related to planned obsolescence of TSV-based 3D NoCs was proposed. A non-interference based adaptive routing scheme to secure NoCs from side channel and Denial-of-Service (DoS) attacks was pro-posed in T. H. Boraten and A. K. Kodi, "Securing NoCs Against Timing Attacks with Non-Interference Based Adaptive Routing," in Proc. NOCS, October 2018. In T. H. Boraten and A. K. Kodi, "Packet security with path sensitization for NoCs," in Proc. DATE, March 2016, a packet validation technique was proposed to protect compromised network-on-chip (NoC) architectures from fault injection side channel attacks and covert HT communications. A security enhanced NoC was proposed in C. Reinbrecht, A. Susin, L. Bossuet, and J. Sepulveda, "Gossip NoC—Avoiding Timing Side-Channel Attacks through Traffic Management," in Proc. ISVLSI, 2016, which may be able to identify traffic anomalies and handle distributed timing attacks. In M. D. Grammatikakis, K. Papadimitriou, P. Petrakis, A. Papagrigoriou, and G. Kornaros, "Security in MPSoCs: A NoC Firewall and an Evaluation Framework," in IEEE TCAD, vol. 34, no. 8, pp. 1344-1357, August 2015, a self-contained Network-on-Chip (NoC) firewall at the network interface (NI) layer was proposed that checks the physical address against a set of rules, rejects untrusted CPU requests to the on-chip memory, and thereby protects all legitimate processes running in a multicore SoC. While works have focused on security enhancements in ENoCs, none addressed security risks in photonic devices and links nor considered the impact of these risks on PNoCs.

Fabrication-induced PV impacts the cross-section, i.e., width and height, of photonic devices, such as microring resonators and waveguides. In microring resonators, PV causes resonance wavelength drifts, which can be counteracted by using device-level techniques such as thermal tuning or localized trimming, e.g., as proposed in C. Batten, A. Joshi, J. Orcutt, C. Holzwarth, M. Popovic, J. Hoyt, F. Kartner, R. Ram, V. Stojanovic, and K. Asanovic, "Building manycore processor-to-dram networks with monolithic silicon photonics," in Hotl, pp. 21-30, 2008. Trimming can induce blue shifts in the resonance wavelengths of microring resonators using carrier injection into microring resonators, whereas thermal tuning can induce red shifts in MR resonances through heating of microring resonators using integrated heaters. To remedy PV, the use of device-level trimming/tuning techniques may be used; but their use may also enable partial detuning of microring resonators that can be used to snoop data from a shared photonic waveguide. In addition, S. V. R. Chittamuru, I. Thakkar, and S. Pasricha, "Process Variation Aware Crosstalk Mitigation for DWDM based Photonic NoC Architectures," in Proc. ISQED, March 2016; S. V. R. Chittamuru, I. Thakkar, and S. Pasricha, "PICO: Mitigating Heterodyne Crosstalk Due to Process Variations and Intermodulation Effects in Photonic NoCs," in Proc. DAC, June 2016; and S. V. R. Chittamuru, I. Thakkar, and S. Pasricha, "HYDRA: Heterodyne Crosstalk Mitigation with Double Microring Resonators and Data Encoding for Photonic NoCs," in TVLSI, vol. 26, no. 1, 2018 discuss the impact of PV-remedial techniques on crosstalk noise but do not address the impact of PV-remedial techniques on hardware security in PNoCs.

Multicast Capable Secured Photonic Communication Architecture

Figure 11:
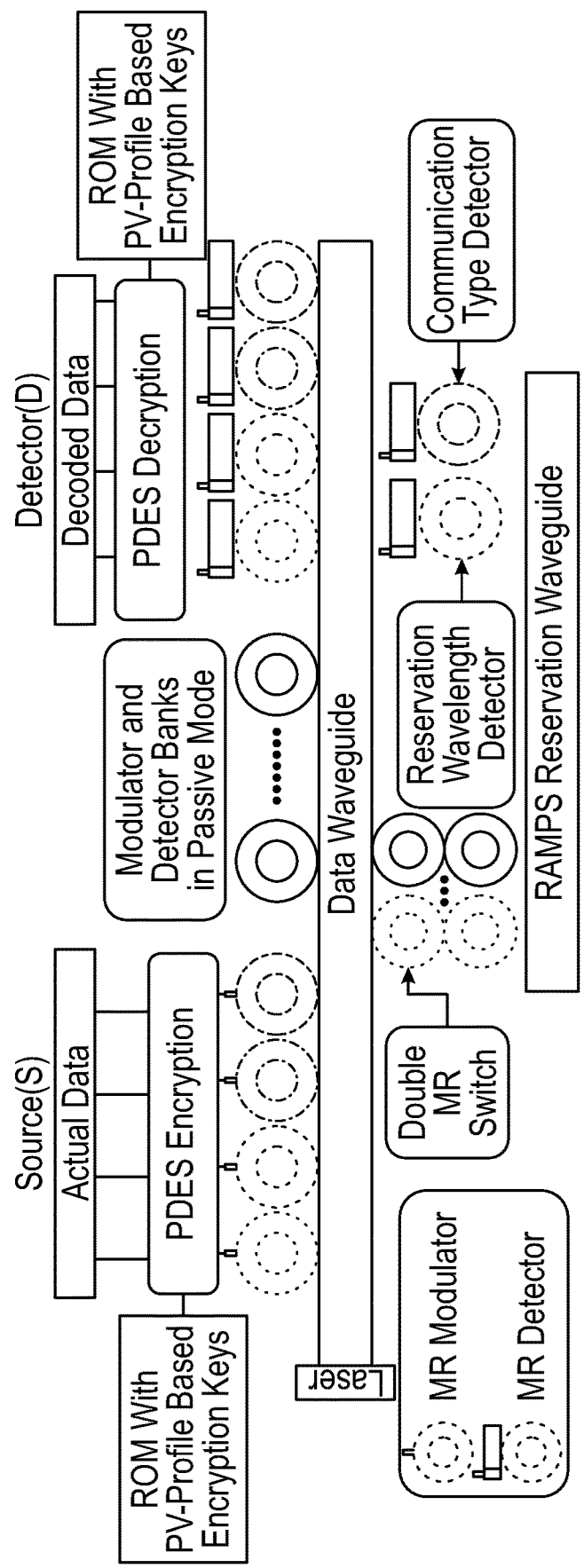
FIG. 11 is a diagram showing another implementation of the DWDM-based photonic communication architectures configured for both unicast and multicast communication in accordance with an illustrative embodiment.

FIG. 11 is a diagram showing another implementation of the DWDM-based photonic communication architectures configured for both unicast and multicast communication in accordance with an illustrative embodiment.

In FIG. 11, the framework integrates two security enhancing strategies: (i) Privy Data Encipherment Scheme (PDES) and (ii) Reservation-Assisted Metadata Protection Scheme (RAMPS). PDES uses, in some embodiments, the PV profiles of the detector microring resonators, e.g., as discussed in relation to FIGS. 1-10, to generate unclonable keys that are used for encrypting data before transmission. In some embodiments, PDES employs the encryption module (e.g., 110) as described in relation to FIG. 4. To enable secure sharing of the generated encryption keys, PDES incorporates, in some embodiments, communication metadata (e.g., identity of target destination GI, type of communication—unicast or multicast) into its data encryption-decryption process. The communication metadata may be transmitted in a separate waveguide (shown as 1102) from the reservation waveguide and communication waveguide. PDES additionally protects data from snooping GIs by using a utilized communication metadata that is kept secret/non-disclosed. Security of communication metadata from snooping attacks may be at risk in many PNoC architectures for example when the PNoCs use the same waveguide to transmit both the communication metadata and actual data. To further enhance security for these PNoCs, the exemplified embodiments employ an architecture-level Reservation-Assisted Metadata Protection Scheme (RAMPS) that uses a secure reservation wave-guide, e.g., as that discussed above, to prevent or guard against the stealing of communication metadata by snooping GIs.

Indeed, malicious destination GIs can snoop data from a shared waveguide. Data encryption may be used so that the malicious destination GIs cannot decipher the snooped data. For the encrypted data to be truly undecipherable, the malicious GIs in a PNoC should not be able to clone the algorithm (or method) used to generate the keys used for data encryption. To generate unclonable encryption keys, the instant Privy Data Encipherment Scheme (PDES), in some embodiments, uses the PV profiles of microring resonators. As discussed in S. K. Selvaraja, "Wafer-Scale Fabrication Technology for Silicon Photonic Integrated Circuits," PhD thesis, Ghent University, 2011, which is incorporated by reference herein in its entirety, process variation (PV) may induce random shifts in the resonance wavelengths of the microring resonators used in a PNoC. In some embodiments, these resonance shifts are in the range from −3 nm to 3 nm. The microring resonators that belong to the different GIs in a PNoC may have different PV profiles. In some embodiments, the microring resonators that belong to the different MR banks of the same GI also have different PV profiles. Due to their random nature, the MR PV profiles prevents cloning by malicious GIs. Using the PV profiles of microring resonators, PDES can generate a unique encryption key for each MR bank in a PNoC. In other embodiments, conventional method of generating unique encryption key can be used (e.g., via a random number or pseudorandom number generator) to generate keys for use in Privy Data Encipherment Scheme.

To enhance security further, in some embodiments, the unclonable key used for data encryption are kept secret from the snooping GIs. Because the identity of the snooping GIs in a PNoC are not known, decision whether or not to share the encryption key with a destination GI (that can be malicious) for data decryption may have to be addressed. Moreover, in case of multicast communication with a PNoC, an encrypted data message can be communicated to more than one destination GIs simultaneously—making it more difficult to identify to which destination GIs encryption key can be shared.

In some embodiments, PDES uses metadata such as (i) identity of target destination GIs, (ii) type of data communication—unicast or multicast for any one or all of its key generation, key sharing, and data encryption-decryption processes.

In some embodiments, PDES utilizes the PV profiles of modulator microring resonators, detector microring resonators, switches, or combination thereof to generate unclonable encryption keys. In some embodiments, PDES utilizes, at least, PV profiles of destination GIs' detector microring resonators to generate encryption keys. Doing so may facilitate (i) generation of different encryption keys for unicast and multicast communications, (ii) generation of a unique encryption key for each destination GI of every MWMR waveguide, and (iii) sharing of generated encryption keys in a secured manner.

In some embodiments, measurement and use of PV profiles of thousands of microring resonators in a PNoC for key generation are performed during testing phase of CMP chip. In some embodiments, PDES generates encryption keys from MR PV profiles, or other means, during the testing phase of the CMP chip. In some embodiments, the PV-induced resonance shifts in all microring resonators of every destination GI's detector bank are measured in situ. In some embodiments, the PV-induced resonance shifts are measured using a dithering signal based method. Examples of dithering signal methods are described in K. Padmaraju, D. F. Logan, T. Shiraishi, J. J. Ackert, A. P. Knights, and K. Bergman, "Wavelength Locking and Thermally Stabilizing Microring Resonators Using Dithering Signals," in JLT, 32 (3), 2013, which is incorporated by reference herein in its entirety.

In some embodiments, for each detector MR of every destination GI, the in-situ method generates an anti-symmetric analog error signal that is proportional to the PV-induced resonance shift in the detector MR. PDES may then use the anti-symmetric analog error signal to control the carrier injection into and heating of the MR to remedy the PV-induced shift in its resonance. Moreover, the analog error signal may be converted into a digital signal (e.g., a 512-bit digital signal). Indeed, a digital error signal may be generated for every detector MR of each destination GI. Other bit numbers for the digital signal may be used. For n-DWDM-wavelengths per waveguide (e.g., 64-DWDM-wavelengths per waveguide), n-detector microring resonators (e.g., 64-detector microring resonators) may be used in every destination GI's detector bank, e.g., to provide a total of digital-error signals (e.g., 64 digital error signal; 512-bits each) for every destination GI. These digital-error signals (e.g., 64 digital error signals) per destination GI are utilized, in some embodiments, to generate a key for unicast communications or for a key for multicast communications. Other number of detector microring resonators may be used.

Unicast Communications:

For unicast communication, for each destination GI, an embodiment of PDES is configured, in some embodiments, to apply an XOR operator to all digital error signals (e.g., 64 digital error signals of 512 bits each) corresponding to the detector MRs (e.g., 64 detector MRs) to create a unique encryption key (e.g., 512 bit encryption key) (referred to as unicast key henceforth). Other encryption key length may be used, e.g., 128 bit, 256 bits, 1024 bits, etc. Having a uniquely different unicast key for every destination GI facilitates PDES to protect each unicast key from malicious snooping GIs. Because the unicast key is present at the GI, there is no need to share a unicast key that is specific to a secure destination GI with any other secure or malicious destination GI. Indeed, embodiments of the PDES scheme facilitates low cost generation and secure utilization of PV-based encryption keys to be used for unicast communications.

Multicast Communications:

For multicast communication, PNoCs is configured to transmit certain messages (e.g., cache coherence messages) to multiple destination GIs simultaneously. In some embodiments, a message may be multicasted in a waveguide that connects multiple destination GIs (e.g., MWMR or SWMR waveguide). The tuning circuit of each target destination GI may partially detune its detector MRs from their resonance wavelengths such that a significant portion of the photonic signal energy in the data-carrying wavelengths continues to propagate in the waveguide to be absorbed in all subsequent target destination GIs. Example of such detuning are described in Y. Pan, P. Kumar, J. Kim, G. Memik, Y. Zhang, and A. Choudhar, "Firefly: Illuminating future network-on-chip with nanophotonic," in Proc. ISCA, 2009; C. Li, M. Browning, P. V. Gratz, and S. Palerm, "Energy-efficient optical broadcast for nanophotonic networks-on-chip," in Proc. OIC, pp. 64-65, 2012; and C. Li, M. Browning, P. V. Gratz, and S. Palermo, "LumiNOC: A Power-Efficient, High-Performance, Photonic Network-on-Chip," in IEEE TCAD, Vol. 33, No. 6, pp. 826-838, 2014, which are each incorporated by reference herein in its entirety. Indeed, partial tunability of destination GIs' detector MRs facilitate multicast communications in PNoCs.

Similar to unicast communication, PDES may use data encryption to secure multicast communications. Because in multicast communication messages are sent to multiple destination GIs, in some embodiments, a multicast key is used which is common for all possible target destination GIs such that any target destination GI can decrypt the received multicast message. To secure the multicast key, PDES may employ communication metadata (e.g., the information about the type of communication—unicast or multicast).

In some embodiments, to generate a multicast key for an MWMR waveguide, PDES is configured to perform an XOR operation of all unicast keys corresponding to all destination GIs of the MWMR waveguide to generate a single multicast key for every MWMR. For example, where 512-bits unicast keys are used, the multicast key resulting from the XOR is also 512 bits. Other size bits may be used.

Figure 12:
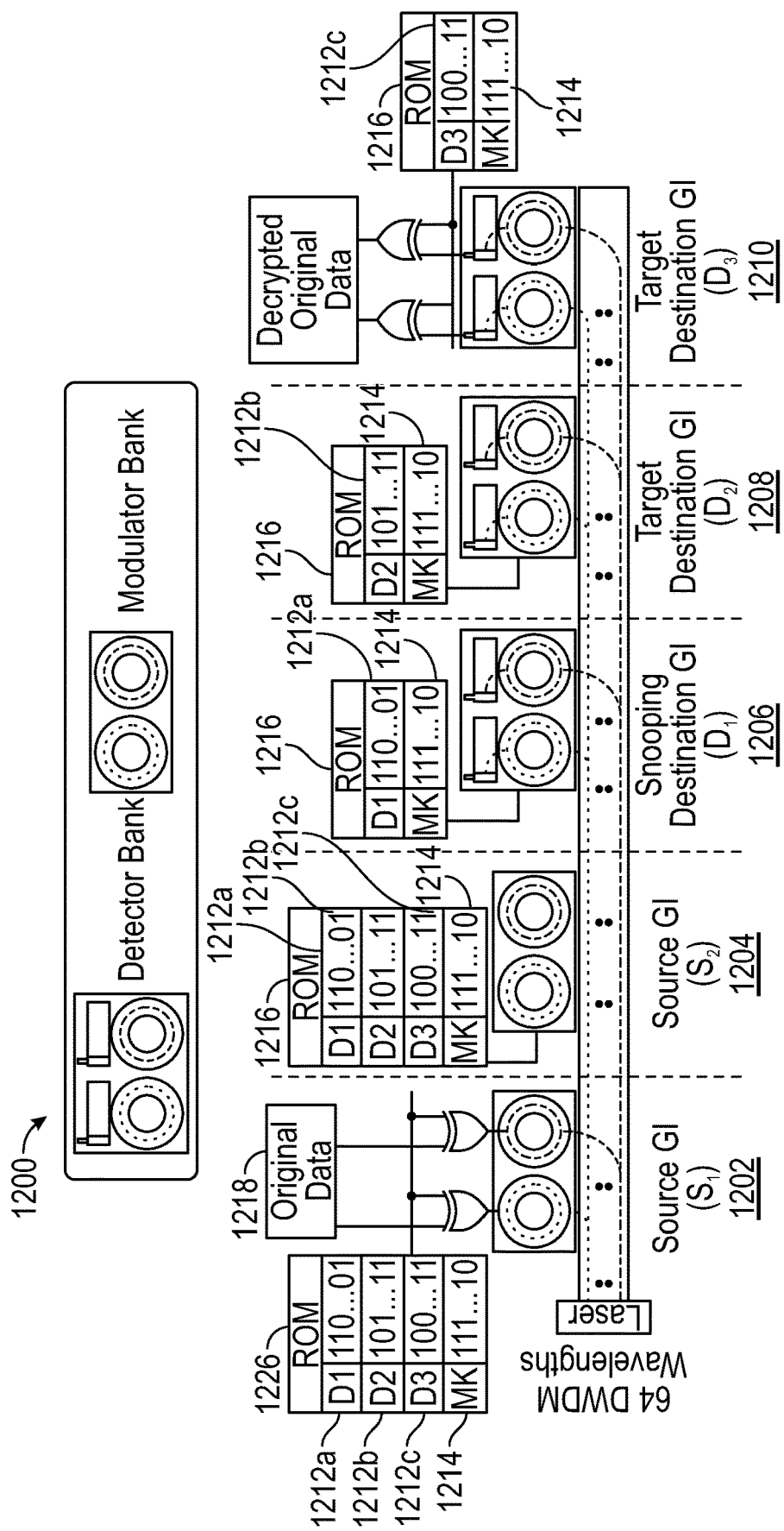
FIG. 12 shows operations of use of unicast and multicast keys in the encryption of data in photonic links in accordance with an illustrative embodiment.

FIG. 12 shows operations of the use of unicast and multicast keys in the encryption of data in photonic links according to an illustrative embodiment. In FIG. 12, an example photonic link 1200 is shown with one MWMR waveguide that connects the modulator banks of two source GIs ("S1" and "S2") (shown as 1202 and 1204 respectively) with the detector banks of three destination GIs ("D1", "D2", and "D3") (shown as 1206, 1208, and 1210 respectively). As there are three destination GIs on the link 1200, PDES may create three unicast keys (e.g., 512-bit keys) corresponding to them, and stores the unicast keys at respective destination GIs and both source GIs. Then, PDES may create one a single multicast key (e.g., 512-bit key from XOR of the unicast keys) specific to the MWMR waveguide and stores the multicast key at all source and destination GIs (i.e., "S1" (1202), "S2" (1204), "D1" (1206), "D2" (1208), and "D3" (1210)). Indeed, in some embodiments, a multicast key is generated for each group of destination GIs by using unicast keys from all, or some, of such destination GI.

As shown in FIG. 12, each source GI (1202, 1204) stores three unicast keys (1212a-1212c) for each destination GI (e.g., destination GIs "D1", "D2", and "D3") and a multicast key 1214 in its local memory 1216 (e.g., ROM or other non-volatile memory, e.g., EPROM, EEPROM, EAROM, flash memory) and every destination GI (e.g., 1206, 1208, 1210) stores only the corresponding unicast key along with the multicast key in its ROM. During operation, when data is to be transmitted by a source GI (e.g., 1202 or 1204), depending on the type of communication, appropriate key from the local ROM is used to encrypt data at the packet-level granularity, e.g., via an XOR operation performed between the key and the data packet of the same length.

For unicast communication, when "S1" (1202) transmits data packet (e.g., 1218) to "D3" (1210), in some embodiments, "S1" (1202) first accesses the unicast key (1212c) corresponding to "D3" (1210) from a local ROM 1216 and XORs the data packet 1218 with the retrieved key 1212c to generate an encrypted data packet, and then transmits the encrypted data packet over the link. At "D3" (1210), the encrypted data packet is received and then decrypted using the unicast key and multicast key stored in its ROM. To access the key for decryption (e.g., 1212c or 1214), "D3" identifies whether the received data packet is multicast or unicast. In some embodiments, the source GI may communicate the identity of the target destination GI and type of transmitted data packet beforehand, during a reservation selection phase. Here, in this example, "S1" (1202) informed "D3" (1210) of the target and type of the transmitted data packet using the reservation channels. At "D3" (1210), the received encrypted data packet is decrypted by an XOR operation using the unicast key corresponding to "D3" retrieved from its local ROM. Indeed, even if a malicious destination GI at "D1" (not shown) snoops the data intended for "D3" (1210), it cannot decipher the data as it neither knows the target destination for the snooped data nor can access the correct key (unicast key corresponding to "D3") for decryption.

For multicast communication, when "S1" (1202) wants to multicast a data packet to "D2" (1208) and "D3" (1210), "S1" (1202) may first access the multicast key 1214 from the local ROM 1216 and perform an XOR operation of the data packet 1218 with the key 1214 to generate the encrypted data packet for transmission over the link. Both "D2" (1208) and "D3" (1210) may have been informed about the transmitted packet beforehand (e.g., via a reservation selection operation) to receive the multicast data packet. At "D2" (1208) and "D3" (1210), the received data packet is decrypted using an XOR operator performed with the multicast key 1214 stored in the local ROMs of "D2" and "D3". Indeed, even if a malicious destination GI at "D1" (not shown) snoops the multicast data packet, it cannot decipher the data in spite of having access to the correct multicast key because the malicious destination GI D1 does not know that its snooped data is multicast, and therefore, it does not know whether to use the unicast key or multicast key from its ROM for data decryption.

Thus, embodiments of the PDES scheme can protect unicast and multicast data communications against snooping attacks in DWDM based PNoCs.

In some embodiments, PDES generates the unicast and multicast keys during the testing phase of the CMP chip. To this end, the XOR logic used for key generation can be implemented external to the CMP chip. Indeed, no overhead of key generation is incurred in the CMP chip. Further, the same dithering signal based control mechanism used for in-situ remedying of PV-induced resonance shifts in MRs may also be used for key generation. Thus, the key generation process using PDES, in some embodiments, may not incur any extra area overhead on the CMP chip. Use of ROM to store the generated keys may incur some area and power overhead at every GI; the resulting overall (system-wide) overhead depends on the underlying PNoC architecture. Data encryption at the source GI and data decryption at the destination GI may be performed in 1 cycle.

For unicast data protected with PDES to be deciphered, a snooping GI must have access to (i) the unicast key corresponding to the target destination GI, and (ii) the identity information of the target destination GI. Because a unicast key is stored only at all source GIs and at the corresponding destination GI, which makes it physically inaccessible to a snooping destination GI. However, if more than one GIs in a PNoC are compromised due to HTs in their control units and if these HTs launch a coordinated snooping attack, the use of separate reservation scheme may guard against such snooping.

For instance, consider the photonic link in FIG. 12, if both "S1" and "D1" are compromised, then the HT in S1's control unit can access the unicast keys corresponding to "D1", "D2", and "D3" from its ROM and transfer them to a malicious core (a core running a malicious program). Moreover, the HT in D1's control unit can snoop the data in-tended for "D3" and transfer it to the malicious core. Thus, the malicious core may have access to the snooped data as well as the unicast keys stored at the source GIs. Nevertheless, accessing the unicast keys stored at the source GIs is not sufficient for the malicious GI (or core) to decipher the snooped data because the compromised ROM typically has multiple unicast keys corresponding to multiple destination GIs, and choosing a correct unicast key that can decipher data requires the knowledge of the target destination GI. In other words, despite applying a brute force method using all of the keys from a compromised ROM, a malicious destination GI is unable to identify correct data without data destination GI information. Thus, PDES can secure unicast data communications in PNoCs even if the unicast keys are compromised, as long as the malicious GIs (or cores) do not know the target destinations for the snooped data.

For multicast communication, unlike unicast keys, multicast keys may not be kept secret, in some embodiments, from snooping destination GIs by design. To this end, rather all destination GIs, including the malicious ones, may have access to the multicast keys. Nevertheless, if a malicious destination GI snoops the multicast data packet, it cannot decipher the data in spite of having access to the correct multicast key in its ROM because the malicious GI does not know that its snooped data is multicast, and therefore, it does not know whether to use the unicast key or multicast key from its ROM for data decryption. Similar to unicast communication, a brute force method is not sufficient for the malicious destination GI to identify correct data without knowing the type of snooped data. Thus, PDES can secure multicast data communications in PNoCs, as long as the malicious GIs (or cores) do not know the type of the snooped data.

Indeed, PDES can protect unicast and multicast data from being deciphered by a snooping GI, as long as the communication metadata (i.e., information about the target destination GI and type of data communication) associated with the snooped data can be kept secret from the snooping GI. To further protect unicast and multicast data, PNoC architectures that employ photonic links with multiple destination GIs should use different waveguides to transmit the actual data and communication metadata. Where the same waveguide is used, a malicious GI may more readily tap the communication metadata from the shared wave-guide.

Reservation Assisted Metadata Protection Scheme

In PNoCs that use photonic links with multiple destination GIs, data may be transferred in two time-division-multiplexed (TDM) slots called reservation slot and data slot. Examples of such photonic links are described in D. M. Ancajas, K. Chakraborty, and S. Roy, "Fort-NoCs: Mitigating the Threat of a Compromised NoC," in Proc. DAC, 2014 and C. Chen and A. Joshi, "Runtime management of laser power in silicon-photonic multibus NoC architecture," in Proc. IEEE JQE, 2013. To minimize photonic hardware, PNoCs in some embodiments is configured to use the same waveguide to transfer both slots.

In the presence of an HT, a malicious GI can tap communication metadata from the shared wave-guide during the reservation slot using the same detector bank that is used for data reception. Tapping of communication metadata can provide the malicious GI with important information that enables it to choose the correct encryption key from the compromised ROM to decipher its snooped data.

To reduce such security risk, among others, an architecture-level Reservation-Assisted Metadata Protection Scheme (RAMPS) is used in some embodiments. In RAMPS, a separate reservation waveguide is implemented to carry reservation slots that is separate from a data waveguide that carries data slots.

Figure 13:
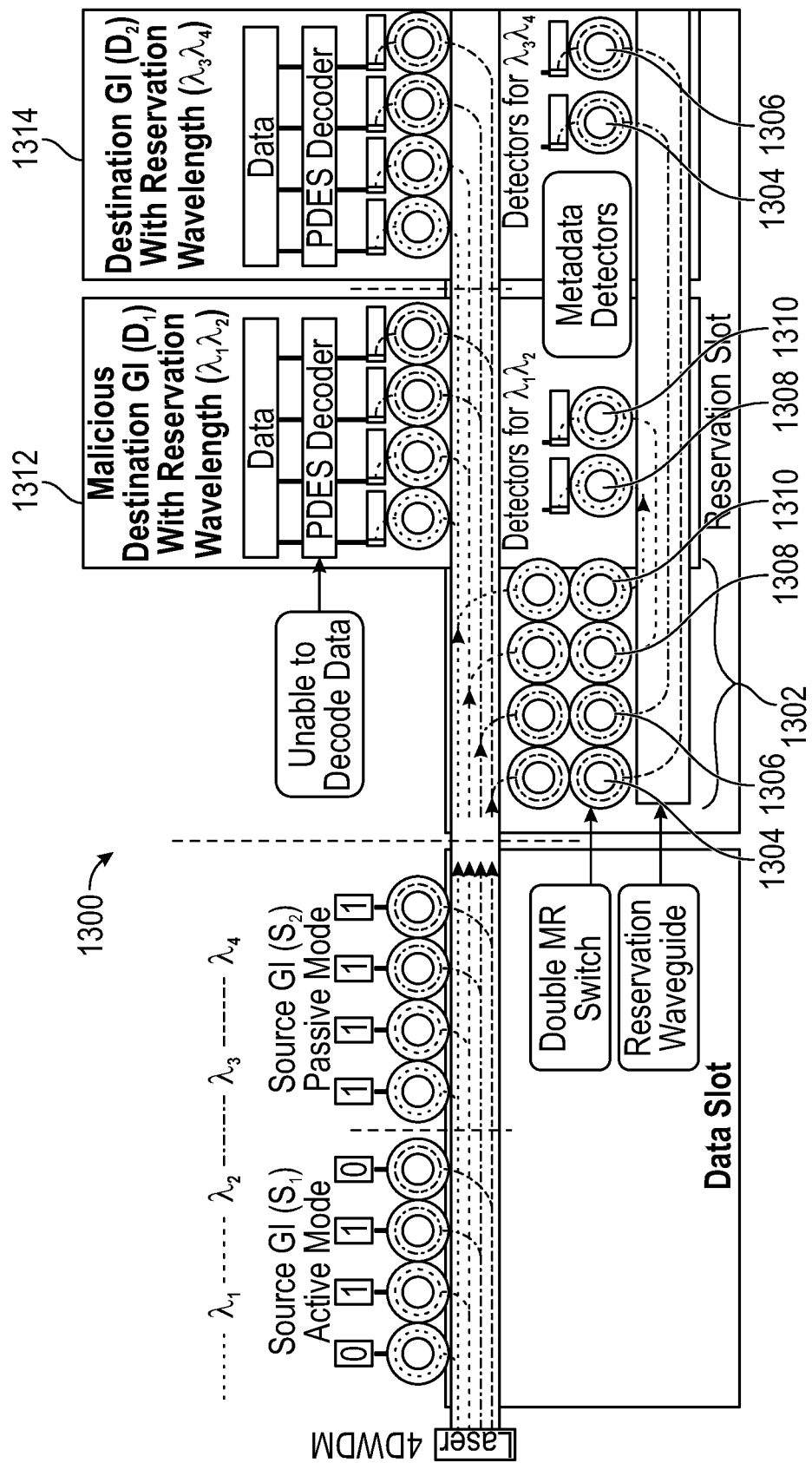
FIG. 13 is a diagram of an architecture-level Reservation-Assisted Metadata Protection Scheme (RAMPS) in accordance with an illustrative embodiment.

FIG. 13 is a diagram of an architecture-level Reservation-Assisted Metadata Protection Scheme (RAMPS) 1300 in accordance with an illustrative embodiment. In FIG. 13, double MRs 1302 is implemented to switch the signals of reservation slots from the data waveguide to the reservation waveguide. Double MRs 1302 may include two or more MRs in the switch and in the detector. In FIG. 13, double MR 1302 includes two sets of MRs: MRs 1304 and 1306 in the switch and in a first detector; MRs 1308 and 1310 in the switch and in the second detector. Double MRs (e.g., instead of single MRs for switching) may ensure that the switched signals do not reverse the propagation direction after switching. Double MRs are further described in S. V. R. Chittamuru, I. Thakkar, and S. Pasricha, "HYDRA: Heterodyne Crosstalk Mitigation with Double Microring Resonators and Data Encoding for Photonic NoCs," in TVLSI, vol. 26, no. 1, 2018, which is incorporated herein in its entirety. Double MRs may also provide low signal loss due to steeper roll-off of their filter responses, which can be lower than single MR. In some embodiments, double MRs are configured to switch "ON" only when the photonic link is in a reservation slot, otherwise the double MRs are configured to switched "OFF" to let the signals of the data slot pass by in the data waveguide.

Furthermore, in RAMPS, in some embodiments, each destination GI has only two detectors on the reservation waveguide: one corresponding to the GI's receiver selection wavelength; the other corresponding to a wavelength signal that transmits communication type information. For example, in FIG. 13, destination GI "D1" 1312 and destination GI "D2" 1314 is shown having detectors corresponding to its respective reservation selection wavelengths $\lambda 1$ and $\lambda 3$, respectively, on the reservation waveguide. In addition, D1 and D2 is shown to have detectors corresponding to wavelength signals $\lambda 2$ and $\lambda 4$, respectively, that transmit communication type information. Henceforth, wavelengths $\lambda 1$ ($\lambda 3$) and $\lambda 2$ ($\lambda 4$) are referred to as metadata wavelengths of D1 (D2) and its respective corresponding detectors on the reservation waveguide are referred to as metadata detectors of D1 (D2). In some embodiments, for metadata wavelengths of D1 (D2), the presence of its reservation selection wavelength $\lambda 1$ ($\lambda 3$) and absence of its communication type wavelength $\lambda 2$ ($\lambda 4$) in the reservation waveguide indicates that the incoming data in the next data slot is unicast to D1 (D2), whereas the presence of both metadata wavelengths $\lambda 1$ ($\lambda 3$) and $\lambda 2$ ($\lambda 4$) indicates that the incoming data is multicast to multiple destination GIs including D1 (D2). Similarly, the absence of both metadata wavelengths $\lambda 1$ ($\lambda 3$) and $\lambda 2$ ($\lambda 4$) may indicate that D1 (D2) will not receive any data in the next data slot. Thus, destination GIs can receive important communication metadata on their corresponding metadata wavelengths, using their metadata detectors in the reservation slot. The destination GIs may use this communication metadata to prepare their detector bank for data reception in the data slot and for selection of the appropriate encryption key (unicast or multicast key) for data decryption. Other coding schemes may be used.

Use of separate reservation waveguide and metadata detectors improves security and prevent snooping as a malicious GI, e.g., at D1 as shown in the example in FIG. 13, by preventing snooping of metadata wavelengths ($\lambda 3$ and $\lambda 4$) of D2 from the reservation slot. because the malicious GI at D1 would not have metadata detectors corresponding to D2's metadata wavelengths ($\lambda 3$ and $\lambda 4$) on the reservation waveguide. However, even if the HT in a D1's control unit attempts to snoop D2's metadata wavelengths ($\lambda 3$ and $\lambda 4$) in the reservation slot by retuning D1's metadata detectors, to succeed, the HT would have to perfect time and target the wavelengths of its snooping attack. Given the large number of utilized metadata wavelengths corresponding to the large number of destination GIs, a malicious GI at D1 would not know the communication metadata, and therefore, cannot identify the correct encryption key to decipher the snooped data. Indeed, RAMPS may enhance the security in PNoCs by protecting both the actual data and communication metadata from snooping attacks, even when the encryption keys used to secure data are compromised.

Experimental Results for SOTERIA with Multicast/Unicast Capabilities on PNoCs

LumiNoC PNoC:

An additional study was conducted to also integrated embodiments of SOTERIA with a 256-core 64-tile LumiNoC PNoC with 16 MWMR data channels for intertile communication. The 64-tiles were arranged in 8×8 grid with each tile having four cores that were interconnected using a concentrator. Among the 16 MWMR data channels, 8 MWMR channels were laid out horizontally and the remaining 8 MWMR channels were laid out vertically. In the 8×8 grid of tiles, each horizontal MWMR channel connected 8 tiles that constituted one of the 8 rows of the grid, and each vertical MWMR channel connected 8 tiles constituting one of the 8 columns of the grid. Each MWMR data channel in the embodiment of LumiNoC had four MWMR waveguides and were connected with total 8 source GIs and 8 destination GIs corresponding to 8 tiles. Each of these four waveguides includes 64 DWDM wavelengths which were used for arbitration, receiver selection, and data transfer. In embodiments of the a SOTERIA-enhanced LumiNoC, the additional study added a reservation waveguide to each MWMR data channel. Similar to improvements made to embodiments of Firefly and Flexishare, each destination GI of embodiments of the modified LumiNoC also had 2 metadata detector MRs on the reservation waveguide which were used to detect the reservation selection and communication type wavelengths. Therefore, each reservation waveguide had 16 metadata detector MRs corresponding to 8 destination GIs. To facilitate PDES, each source GI was configured with a ROM configured with 9 entries of 512 bits each to store eight 512-bit unicast keys and one 512-bit multicast key, and each destination GI is configured with a ROM configured with two entries of 512 bits each to store one 512-bit multicast key and one 512-bit unicast key.

Figure 14A:
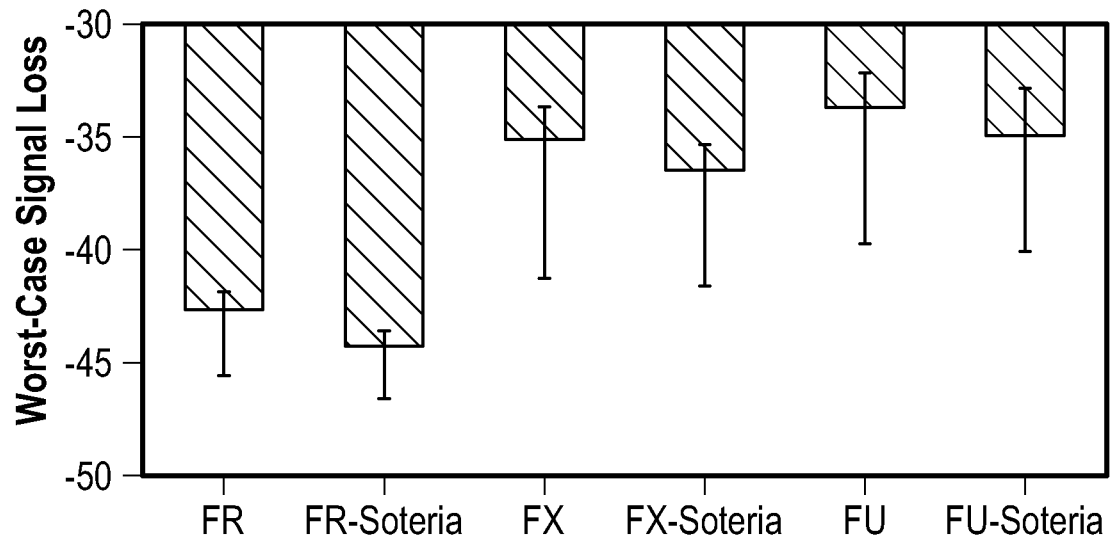
FIG. 14A shows results of FIG. 8A of a worst-case signal loss analysis between a baseline PNoC and two PNoCs and additionally the same for LumiNoC PNoCs configured with the SOTERIA architecture in accordance with an illustrative embodiment.

FIG. 14A show results of FIG. 8A of a worst-case signal loss analysis between a baseline PNoC and two PNoCs and additionally the same for LumiNoC PNoCs configured with SOTERIA in accordance with an illustrative embodiment. In the study, 16 MWMR data channels of a LumiNoC PNoC were equipped with PDES encryption/decryption as well as reservation waveguides for the RAMPS scheme.

Figure 14B:
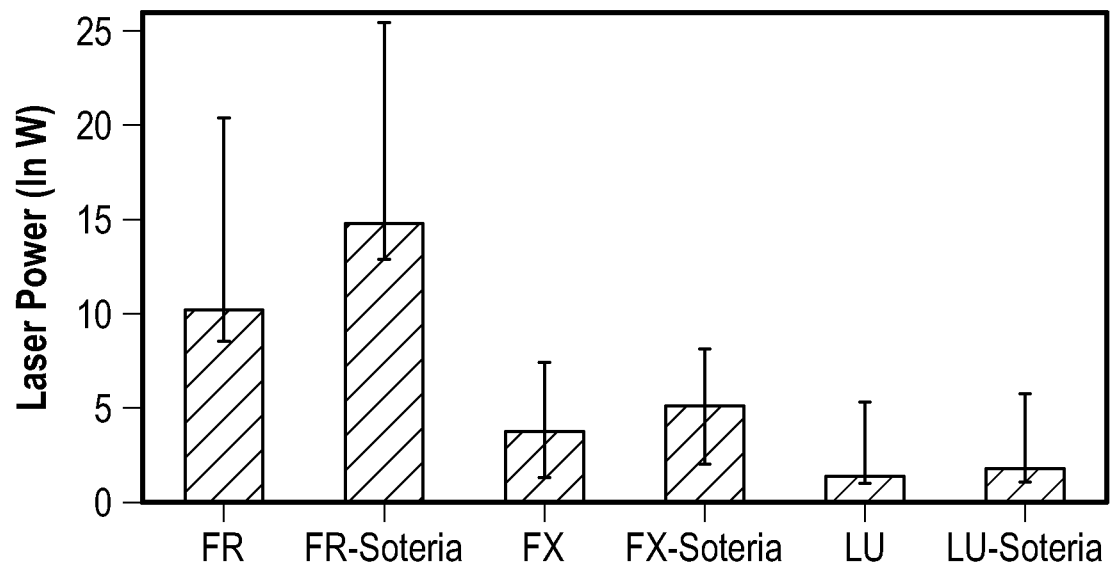
FIG. 14B shows results of total photonic laser power and corresponding electrical laser power for embodiments of SOTERIA-enhanced variants of FIG. 8B and additionally the same for LumiNoC PNoCs in accordance with an illustrative embodiment.

Analytical models were used to also calculate the total signal loss at the detectors of the worst-case power loss node ($N_{WCPL}$) that corresponds to tile $T_{56}$ for the LumiNoC PNoC. From FIG. 14A, LumiNoC PNoC with SOTERIA is further shown (compared to FIG. 8A) with increased loss by 1.4 dB on averaged compared to the baseline. The increase may be attributed to single or double MRs to switch the signals of the reservation slots. FIG. 14B shows results of total photonic laser power and corresponding electrical laser power for embodiments of SOTERIA-enhanced variants of FIG. 8B and additional for LumiNoC PNoCs in accordance with an illustrative embodiment. From FIG. 14B, the LumiNoC PNoCs with SOTERIA is further shown (compared to FIG. 8B) to have higher laser power overheads of 35% on average compared to their baselines.

Figure 15A:
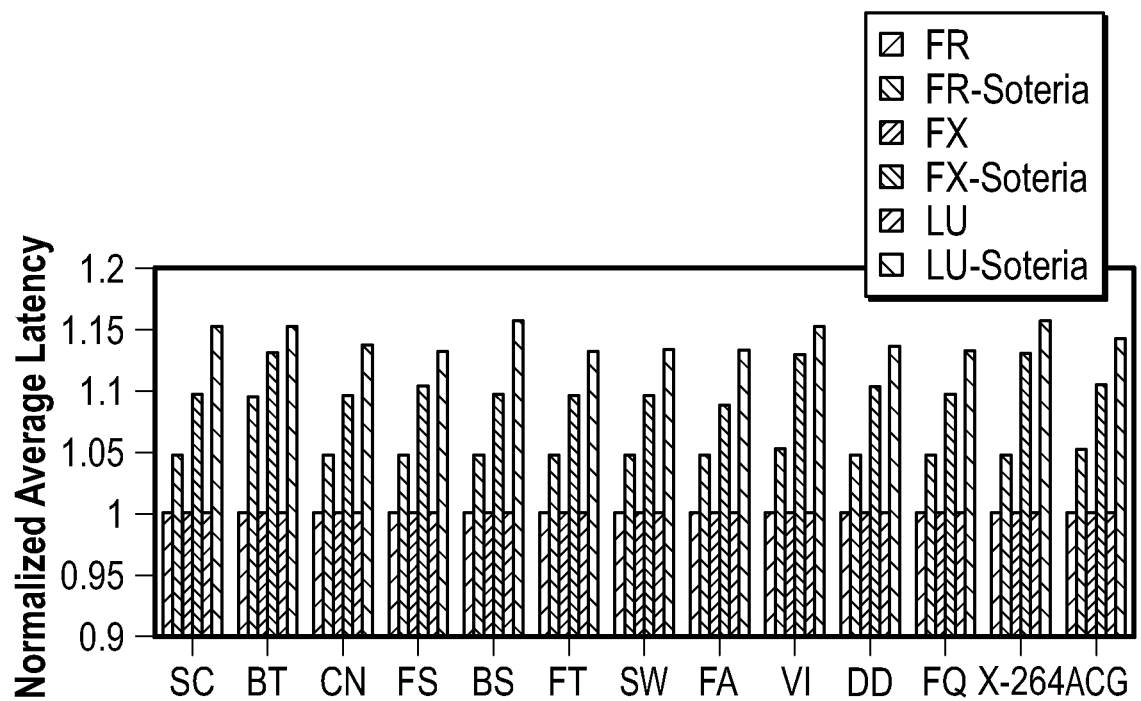
FIG. 15A shows normalized average latency results for embodiments of SOTERIA-enhanced variants of FIG. 9A and additionally the same for LumiNoC PNoCs in accordance with an illustrative embodiment.
Figure 15B:
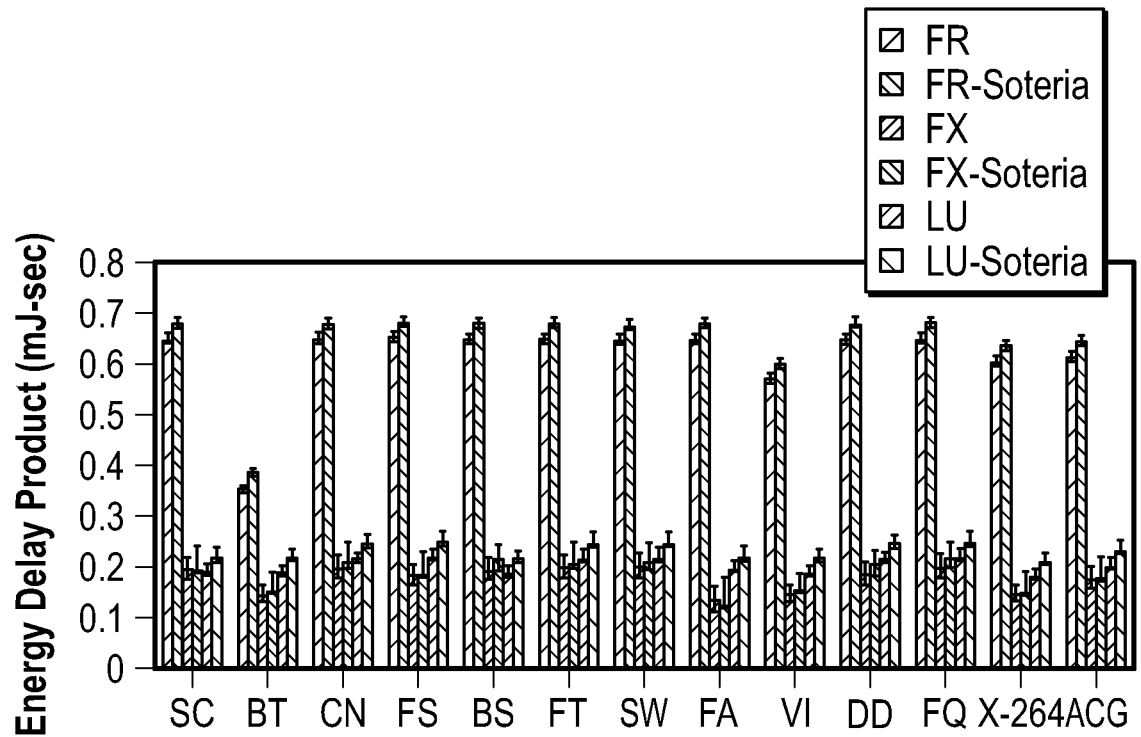
FIG. 15B shows energy-delay product (EDP) comparison for embodiments of SOTERIA-enhanced variants of FIG. 9A and additionally the same for LumiNoC PNoCs in accordance with an illustrative embodiment.

FIG. 15A shows normalized average latency results for embodiments of SOTERIA-enhanced variants of FIG. 9A and additionally the same for LumiNoC PNoCs in accordance with an illustrative embodiment. FIG. 15B shows energy-delay product (EDP) comparison of the same in accordance with an illustrative embodiment. Specifically, FIGS. 15A and 15B present detailed simulation results that quantify the average packet latency and energy-delay product (EDP) for the two configurations of the Firefly, Flexishare, and LumiNoC PNoCs. In FIGS. 15A and 15B, the bars indicates values of average latency and EDP for 100 PV maps; confidence intervals show variation in average latency and EDP across PARSEC benchmarks. Results are shown for twelve multi-threaded PARSEC benchmarks. As shown in FIG. 15A, LumiNoC with SOTERIA is further shown (compared to FIG. 9A) to have 14.2% higher latency on average compared to its respective baseline. The additional delay may be attributed to encryption and decryption of data with PDES. Furthermore, from FIG. 15A, it can be observed that the average packet latency of Flexishare PNoC is higher compared to Firefly PNoC because, in Flexishare, all data packets traverse through photonic MWMR channels, and therefore, they all require encryption-decryption that incur related latency overhead. On the other hand, in Firefly as is a hybrid electric-photonic PNoC, only a few data packets that traverse through the photonic SWMR channels require encryption-decryption, and therefore, only a few data packets incur related latency overhead, reducing the average packet latency for Firefly compared to Flexishare. Moreover, average packet latency for LumiNoC PNoC is higher compared to the other PNoCs because significant number of data packets in this PNoC switch between horizontal and vertical MWMR channels, and hence, undergo encryption-decryption process twice, which in turn increases average packet latency for LumiNoC PNoC.

From the results for EDP shown in FIG. 15B, LumiNoC with SOTERIA is further shown (compared to FIG. 9B) to have 14.6% higher EDP on average compared to its respective baselines. Increase in EDP for the SOTERIA-enhanced PNoCs may be attributed to the increase in their average packet latency as well as to the presence of additional RAMPS reservation waveguides, which may increase the required photonic hardware (e.g., more number of MRs) in an SOTERIA-enhanced/implemented PNoCs. This in turn may increase static energy consumption (i.e., laser energy and trimming/tuning energy), ultimately increasing the EDP. Indeed, embodiments of the SOTERIA framework improve hardware security in PNoCs at a potential cost of additional laser power, average latency, and EDP overheads.

Indeed, the security enhancement framework of SOTERIA can be used to secure data during unicast and multicast communications in DWDM-based PNoC architectures from snooping attacks. Various components and elements of the disclosed SOTERIA framework may be selected wholly or in part to trade-off between security, performance, and energy overhead for the respective NPOC architectures. For example, the metadata channel (e.g., to designate unicast or multicast traffic) may be implemented with an encryption scheme or without an encryption, to modulate the degree of provided security. Embodiments of SOTERIA disclosed herein may facilitate hardware security in crossbar based PNoCs with minimal overheads, in some embodiments, with added overhead up to or less than 14% in average latency and up to or less than 14% in EDP compared to a same baseline implementation without such features Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow;

plain meaning derived from grammatical organization or punctuation; the number or type of embodiments described in the specification.

While the methods and systems have been described in connection with certain embodiments and specific examples, it is not intended that the scope be limited to the particular embodiments set forth, as the embodiments herein are intended in all respects to be illustrative rather than restrictive. In some embodiments, the exemplified methods and systems are used in electronic systems used in IoT devices. In other embodiments, the exemplified methods and systems are used in high performance cloud datacenters and supercomputers.

The exemplified methods and systems can be used in any number of photonic communication and PNoC architectures that employ on-chip, off-chip, in-package, and/or interposer photonic links, including photonic communication devices (e.g., PNoC devices) having single-writer-single-reader (SWSR-based) configuration, single-writer-multiple-reader (SWMR-based) photonic signal transmission medium configuration, multiple-writer-single-reader (MWSR-based) photonic signal transmission medium configuration, and multiple-writer-multiple-reader (MWMR-based) photonic signal transmission medium configuration.

What is claimed is:

1. A method of securing a photonic signal transmission medium in photonic communication that couple pairs of photonic communication devices, the method comprising:
    in a photonic communication device, generating, via electrical circuitries, an analog signal based on anti-symmetric behavior of a microring-resonator of a gateway interface of the photonic communication device;
    converting, via the circuitries, a digital signal comprising a plurality of bits corresponding to the generated analog signal; and
    encrypting, via digital logic or a processor executing a set of instructions, via an encryption key comprising in whole or in part the plurality of bits, data transmitted through or from the gateway interface between a pair of photonic communication devices, including the photonic communication device, wherein the encryption key is uniquely different from other encryption keys used in the encryption of other gateway interfaces of the respective photonic communication devices because of a hardware-based random process-variation profile of the microring-resonator.

2. The method of claim 1, wherein the encryption key is generated based on a modulator microring resonator associated with the photonic communication device of the pair.

3. The method of claim 2, wherein the encryption key is generated based on a detector microring resonator associated with a destination gateway interface for the pair.

4. The method of claim 1, wherein the encryption key is generated for the gateway interface during a testing operation of the photonic communication device.

5. The method of claim 4, wherein the encryption key is maintained at the gateway interface, or a component accessible thereto, associated with the at least one photonic signal transmission medium.

6. The method of claim 5, wherein a unicast encryption key is maintained at the gateway interfaces, or a component accessible thereto, for each destination gateway.

7. The method of claim 6, further comprising:
    transmitting, in a third photonic signal transmission medium, metadata for the communication, wherein the metadata indicates the communication comprises at least a portion of a unicast message or at least a portion of a multicast message.

8. The method of claim 5, wherein the encryption key is employed in whole or in part as a multicast encryption key, the multicast key being maintained at the gateway interface, or a component accessible thereto, wherein the multicast encryption gateway is associated with a set of two or more destination gateways, and wherein the multicast encryption key is generated from two or more encryption keys associated with the two or more destination gateways.

9. The method of claim 1, further comprising:
    reserving a photonic signal transmission medium for data transfer, in a reservation operation, the at least one gateway interface, wherein a reservation signal associated with the reservation operation is transmitted in a second photonic signal transmission medium coupled between the pair of photonic communication devices, and wherein the second photonic signal transmission medium is separate and distinct from the at least one photonic signal transmission medium.

10. The method of claim 9, wherein each of the photonic communication devices of the pair comprises a microring resonator-based switch coupled to at least two photonic signal transmission mediums, including the at least one photonic signal transmission medium and the second photonic signal transmission medium.

11. The method of claim 9, further comprising:
    disabling the second microring resonator during transmission of the data signals across the at least one photonic signal transmission medium.

12. The method of claim 9, further comprising:
    enabling the second microring resonator when performing the reservation operation to route signals to the second photonic signal transmission medium.

13. The method of claim 1, wherein the data is transmitted over the at least one gateway interface as a secure unicast communication.

14. The method of claim 1, wherein the data is transmitted over the at least one gateway interface as a secure multicast communication.

15. A photonic system comprising:
    a plurality of processing cores;
    a photonic communication fabric wherein the fabric is coupled to, at least, a portion of the plurality of processing cores, the photonic fabric comprising a first photonic signal transmission medium for transmission of data signals and a second photonic signal transmission medium for transmission of reservation signals; and
    control logic configured to reserve, in a reservation operation, at least one gateway interface of the photonic communication fabric over the second photonic signal transmission medium, wherein the control logic is configured to:
    generate, via electrical circuitries, an analog signal based on anti-symmetric behavior of a microring-resonator of a gateway interface of the photonic communication device;
    converting, via the circuitries, a digital signal comprising a plurality of bits corresponding to the generated analog signal;
    encrypting, via digital logic or a processor executing a set of instructions, via an encryption key comprising in whole or in part the plurality of bits, data transmitted through or from the gateway interface between a pair of photonic communication devices, including the photonic communication device, wherein the encryption key is uniquely different from other encryption keys used in the encryption of other gateway interfaces of the respective photonic communication devices because of a hardware-based random process-variation profile of the microring-resonator; and transmit a reservation signal comprising the encryption key.

16. The system of claim 15, further comprising:

an encryption circuit, the encryption circuit having stored therein the encryption key associated with each of a plurality of gateway interfaces.

17. The system of claim 16, further comprising:

a second encryption circuit, the second encryption circuit having stored therein a multicast encryption key, wherein the multicast encryption key is generated from two or more encryption keys associated with the plurality of gateway interfaces.

18. A system comprising:

a plurality of photonic communication devices configured with a secured photonic signal transmission medium that couples the photonic communication device to a paired photonic communication device, wherein the photonic communication device is configured to:

generate, via electrical circuitries, an analog signal based on anti-symmetric behavior of a microring-resonator of a gateway interface of the photonic communication device;

convert, via the circuitries, a digital signal comprising a plurality of bits corresponding to the generated analog signal; and encrypt, via digital logic or a processor executing a set of instructions, via an encryption key comprising in whole or in part the plurality of bits, data transmitted through or from the gateway interface between a pair of photonic communication devices, including the photonic communication device, wherein the encryption key is uniquely different from other encryption keys used in the encryption of other gateway interfaces of the respective photonic communication devices because of a hardware-based random process-variation profile of the microring-resonator.

19. The system of claim 18 wherein the photonic communication device is further configured to:

reserve, in a reservation operation, the at least one gateway interface, wherein a reservation signal associated with the reservation operation is transmitted in a second photonic signal transmission medium coupled between the photonic communication device and the paired photonic communication device, and wherein the second photonic signal transmission medium is separate and distinct from the at least one photonic signal transmission medium.

* * * * *